US011067806B2

(12) United States Patent
Kim et al.

(10) Patent No.: US 11,067,806 B2
(45) Date of Patent: Jul. 20, 2021

(54) FOVEATED DISPLAY FOR AUGMENTED REALITY

(71) Applicant: NVIDIA Corp., Santa Clara, CA (US)

(72) Inventors: Jonghyun Kim, Palo Alto, CA (US);
Youngmo Jeong, Sungdong-gu (KR);
Michael Stengel, Cupertino, CA (US);
Morgan McGuire, Waterloo (CA);
David Luebke, Charlottesville, VA (US)

(73) Assignee: NVIDIA Corp., Santa Clara, CA (US)

( * ) Notice: Subject to any disclaimer, the term of this patent is extended or adjusted under 35 U.S.C. 154(b) by 210 days.

(21) Appl. No.: 16/428,713

(22) Filed: May 31, 2019

(65) Prior Publication Data
US 2020/0301146 A1 Sep. 24, 2020

Related U.S. Application Data

(60) Provisional application No. 62/820,768, filed on Mar. 19, 2019.

(51) Int. Cl.
*G02B 27/01* (2006.01)
*G03H 1/22* (2006.01)

(52) U.S. Cl.
CPC ..... *G02B 27/0172* (2013.01); *G02B 27/0179* (2013.01); *G02B 2027/0105* (2013.01); *G02B 2027/0123* (2013.01); *G02B 2027/0174* (2013.01); *G02B 2027/0178* (2013.01); *G02B 2027/0187* (2013.01); *G03H 2001/2284* (2013.01); *G03H 2270/55* (2013.01)

(58) Field of Classification Search
None
See application file for complete search history.

(56) References Cited

U.S. PATENT DOCUMENTS

| 4,623,223 | A | 11/1986 | Kempf | |
|---|---|---|---|---|
| 4,729,029 | A | 3/1988 | Henri et al. | |
| 4,863,468 | A * | 9/1989 | Feinbloom | A61F 2/16 623/6.35 |
| 5,487,665 | A | 1/1996 | Lechner et al. | |
| 5,833,340 | A | 11/1998 | Yoshikawa et al. | |
| 6,408,257 | B1 | 6/2002 | Harrington et al. | |
| 8,189,263 | B1 | 5/2012 | Wang et al. | |
| 8,743,464 | B1 | 6/2014 | Amirparviz | |
| 10,331,207 | B1 * | 6/2019 | Simmons | G02B 27/0172 |
| 10,725,302 | B1 * | 7/2020 | Sharma | G06F 3/0346 |
| 10,852,817 | B1 * | 12/2020 | Ouderkirk | G06K 9/00597 |
| 2002/0057279 | A1 | 5/2002 | Jouppi | |
| 2005/0185281 | A1 | 8/2005 | Perlin et al. | |
| 2010/0045853 | A1 | 2/2010 | Murashima | |
| 2012/0075168 | A1 * | 3/2012 | Osterhout | G06F 3/011 345/8 |
| 2012/0206335 | A1 * | 8/2012 | Osterhout | G06F 3/017 345/156 |

(Continued)

*Primary Examiner* — Jennifer D. Carruth
(74) *Attorney, Agent, or Firm* — Rowant TELS LLC

(57) ABSTRACT

An augmented reality display system includes a first beam path for a foveal inset image on a holographic optical element, a second beam path for a peripheral display image on the holographic optical element, and pupil position tracking logic that generates control signals to set a position of the foveal inset as perceived through the holographic optical element, to determine the peripheral display image, and to control a moveable stage.

18 Claims, 21 Drawing Sheets

(56) References Cited

U.S. PATENT DOCUMENTS

| | | | | |
|---|---|---|---|---|
| 2012/0249797 A1* | 10/2012 | Haddick | ............... | G06F 3/016 348/158 |
| 2012/0320100 A1* | 12/2012 | Machida | ............. | G02B 27/017 345/690 |
| 2017/0206691 A1* | 7/2017 | Harrises | ............. | G02B 27/0172 |
| 2017/0227764 A1* | 8/2017 | Kim | ................... | G02B 27/141 |
| 2018/0348525 A1* | 12/2018 | Kadowaki | ............ | G02B 26/101 |
| 2019/0371028 A1* | 12/2019 | Harrises | ................ | G06T 11/60 |

* cited by examiner

FOVEATED DISPLAY FOR AUGMENTED REALITY

CROSS-REFERENCE TO RELATED APPLICATIONS

This application claims benefit and priority under 35 U.S.C. 119(e) to U.S. application Ser. No. 62/820,768, titled "A FOVIATED DISPLAY FOR AUGMENTED REALITY", filed on Mar. 19, 2019, the contents of which are incorporated herein by reference in their entirety.

BACKGROUND

Augmented reality technology has improved to achieve higher resolution, larger field-of-view, higher computing power, larger eye box, and low latency. In this context, "eye box" refers to an area in which the eye can be positioned forward, backward, and side to side while remaining focused on a target. The angle between those two rays of light at which person loses the ability to distinguish between the two lights is 1/60th of a degree, also known as one arc minute; it plays a major role in understanding spatial frequency. Spatial frequency refers to the level of details present in an image (stimulus) per degree of visual angle. A letter with small details and sharp edges contains higher spatial frequency as compared to a simplified letter with round edges. It is expressed in the number of cycles of alternating dark and light bars (the black and white parts of the letter in case of type) per degree of visual angle also known as "cpd". Humans can perceive a maximum of 60 cycles per degree (cpd) and information beyond that limit is filtered out.

To match the resolution and field of view of the human eye, an augmented reality display should provide 60 cycles per degree, and over 180 degrees field-of-view. This requires over twenty-one thousand pixels in each display dimension, which in turn requires data bandwidth, power, and computation requirements beyond the capabilities of current systems.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
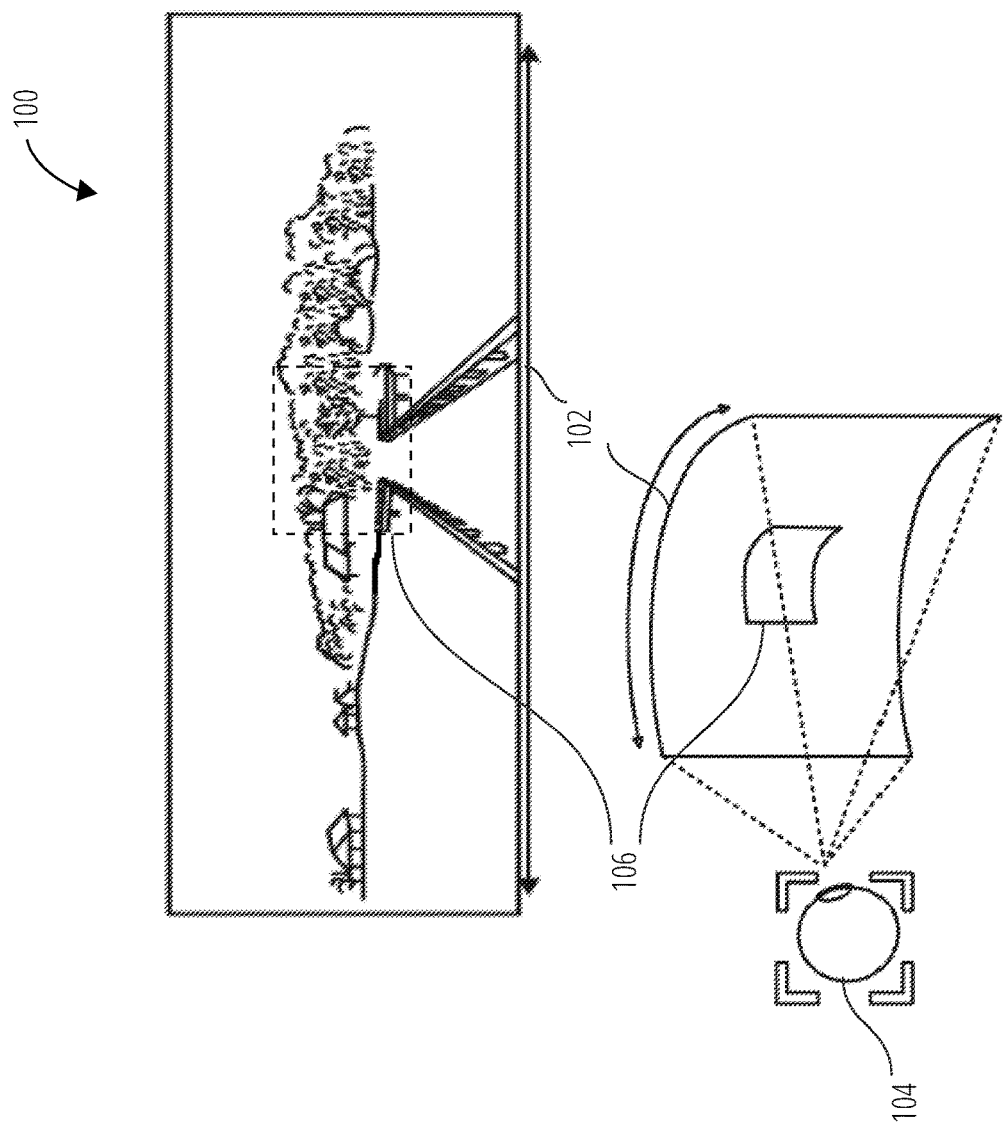
FIG. 1 illustrates a field-of-view display 100 in accordance with one embodiment.

The spatial sensitivity of the retinal cone distribution is highest in the region called the fovea region, which comprises the area of the retina a few degrees around the center of gaze, typically and approximately 4-10 degree for most people. In this context, "fovea region" refers to the fovea centralis a region of closely packed cones in the eye. It is located in the center of the macula lutea of the retina.

Data bandwidth, power, and computing resources may be preserved by utilizing gaze tracking and confining the high resolution rendering of augmented reality and virtual reality displays to an inset display area of the output device representing the user's fovea region (the 'foveal inset'), and utilizing lower resolution rendering for the peripheral regions of the user's gaze. This process is referred to as 'foveated rendering' and the output is referred to as a 'foveated display'.

A foveated augmented reality display system disclosed herein includes three main aspects: a high-resolution foveal inset, a large field-of-view peripheral region, and gaze tracking.

The high resolution foveal inset may be implemented using a micro organic light-emitting diode display enhanced with a magnifier lens. The light rays from the organic light-emitting diode panel are reflected by a primary mirror, a half mirror, and a concave half mirror inside a waveguide. In this context, "half mirror" refers to a mirror that is reflective on one side and transparent at the other. In this context, "primary mirror" refers to a principle or dominant mirror in a beam path. Both sides of the concave half mirror are index-matched to ensure that the image of the user's environment is not distorted. The magnifier lens is reflective to achieve a large eye box (e.g., 16 mm horizontal). A focus cue is generated from 40 cm (for example) to infinity by moving the micro organic light-emitting diode display axially.

The magnified micro organic light-emitting diode output provides focal cues from a single plane. Varifocal operation, with focal cues from 40 cm (for example) to infinity may be achieved by moving the micro organic light-emitting diode axially. The resolution and field-of-view may be improved by increasing the resolution of the micro organic light-emitting diode and/or utilizing a thinner waveguide.

A large field-of-view peripheral region is generating by utilizing a dynamic virtual retinal display with a reflective holographic optical element image combiner (the holographic optical element is also transparent to the inset image incident from the back). In this context, "holographic optical element" refers to an optical element (such as a lens, filter, beam splitter, or diffraction grating) that is produced using holographic imaging processes for example from dichromated gelatin and photoresists. In this context, "beam splitter" refers to a device for dividing a beam of light or other electromagnetic radiation into two or more separate beams. A micro-electro-mechanical system (MEMS) based laser projector may be utilized for the image source. In some embodiments, a steering mirror may be deployed to shift the exit aperture of the peripheral display to track the user's gaze position. However, more preferably the holographic optical element is shifted according to the user's gaze position. It is preferable to use of a moveable stage to translate the position of the holographic optical element and change the position of the foveal inset, versus using a steering mirror, because the former approach generates a significantly expanded eye box than does the latter.

Rays from the projector reflect off the holographic optical element and converge to the pupil position so that the user perceives a large field-of-view, "all-in-focus" image. Within the angular tolerance of the reflective holographic optical element the Maxwellian viewpoint may be shifted by moving the holographic optical element via a moveable stage (or using a steering mirror). In this context, "Maxwellian viewpoint" refers to a pinhole lens configuration wherein the beam is always interpreted as in-focus by the eyes/brain—e.g., a scanned light display using a 0.5 mm diameter beam to scan images to the eye generates a Maxwellian viewpoint.

Gaze tracking is required to position the foveal inset and to position the peripheral display's exit aperture. The foveated augmented reality display may utilize various gaze tracking techniques known in the art. A separate beam path may be utilized inside the waveguide. Infrared (IR) light rays from IR light-emitting diodes may be reflected by the user's cornea and a beam splitter. A pupil tracker captures on-axis eye images through the beam splitter and applies the images to determine the current gaze position. Because the foveal inset from the micro organic light-emitting diode covers a larger region than the user's fovea region, the position of the inset image may be shifted on the micro organic light-emitting diode according to the gaze position. For the peripheral region, the exit aperture of the peripheral display is shifted by translating the holographic optical element in at least one dimension using a moveable stage (or using a steering mirror), so that the user sees the full peripheral image without vignetting.

Compared to conventional augmented reality displays utilizing micro organic light-emitting diode displays, the disclosed augmented reality display provides a larger field of view with improved peripheral display and gaze tracking.

Referring to FIG. 1, a field-of-view display 100 comprises a field-of-view 102, a tracked gaze 104, and a foveal inset display 106.

The field-of-view 102 may include greater than about 21.6 K pixels and have an arc of greater than about 180°. However, as the field-of-view 102 has greater than about 21.6 K pixels, the amount of computation and bandwidth is increased. To reduce the amount of computation and bandwidth utilized, the tracked gaze 104 may be utilized to determine the position of the foveal inset display 106. The tracked gaze 104 may be determined by pupil position tracking logic (a "pupil tracker"), also referred to herein as gaze tracking. The tracked gaze 104 is utilized to determine the area of the field-of-view 102 to display. The center point of the foveal inset display 106 may be determined by the tracked gaze 104 and the size of the foveal inset display 106 may, in some embodiments, be determined by a pre-set number of degrees from the center point. For example, in one embodiment, the pre-set number of degrees is 30°, resulting in an arc of 60° for the foveal inset display 106. The number of degrees may vary in each axial direction, in some embodiments.

Figure 3:
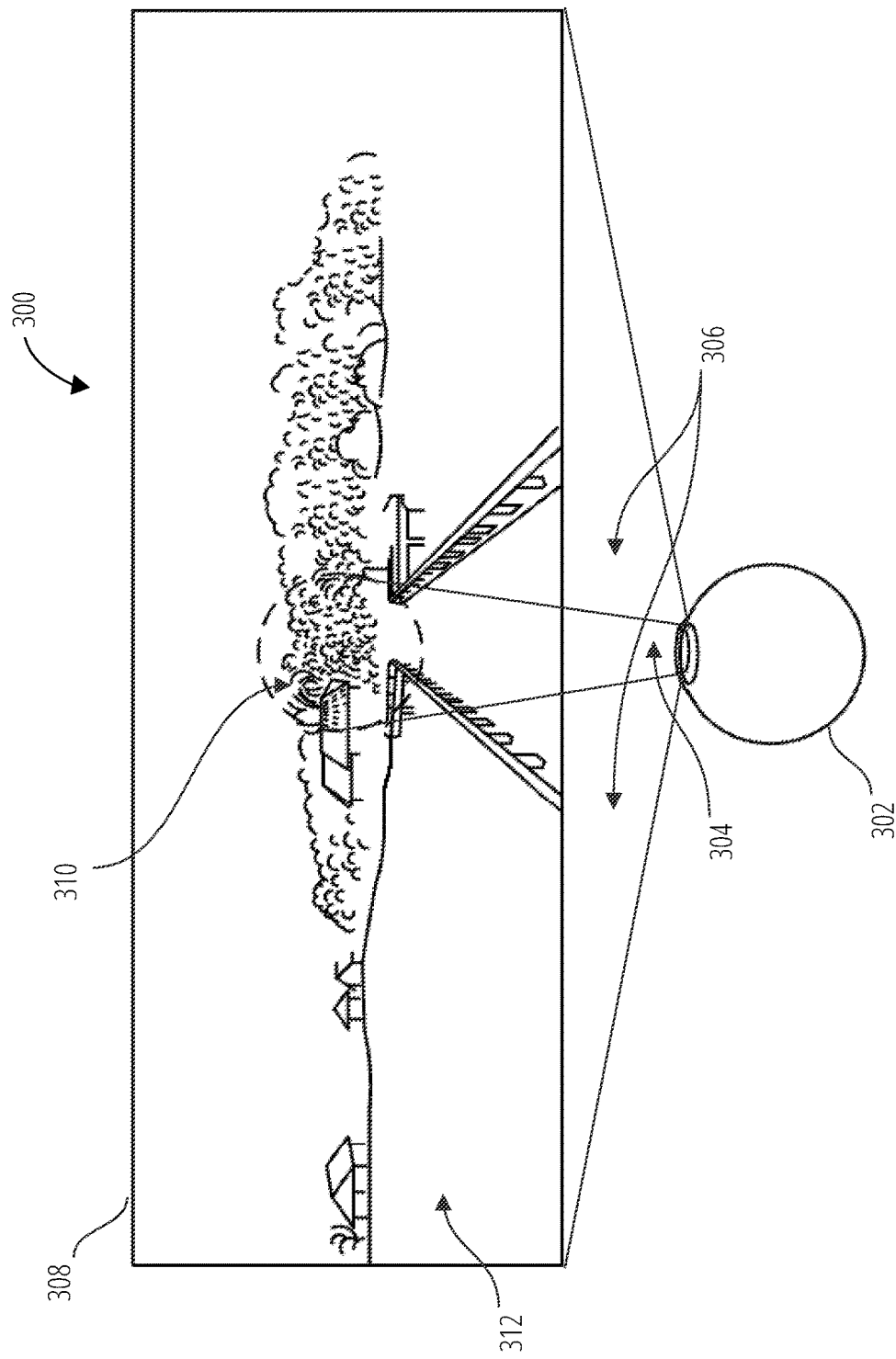
FIG. 3 illustrates a foveated display 300 in accordance with one embodiment.
Figure 4:
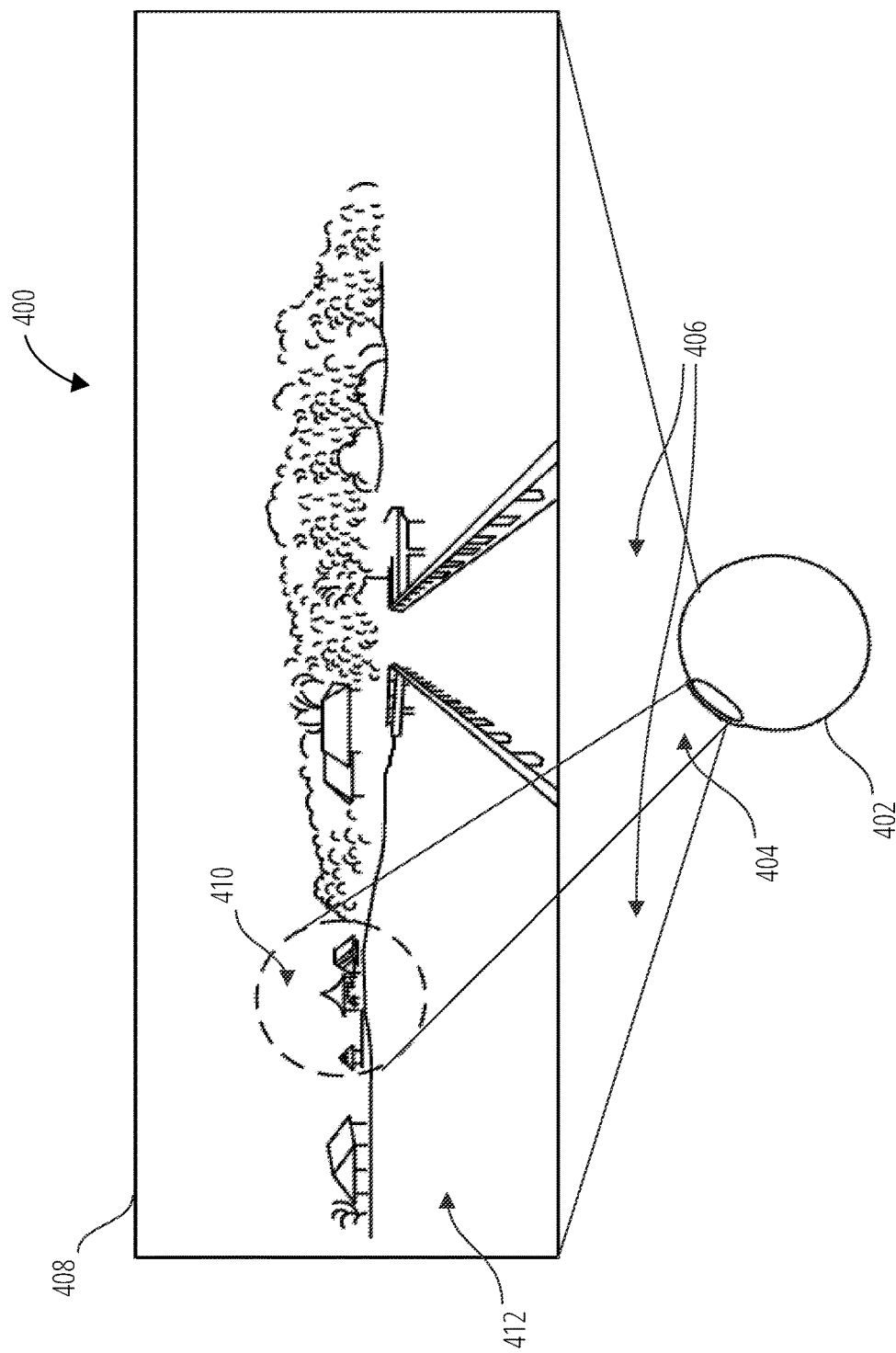
FIG. 4 illustrates a foveated display 400 in accordance with one embodiment.
Figure 5:
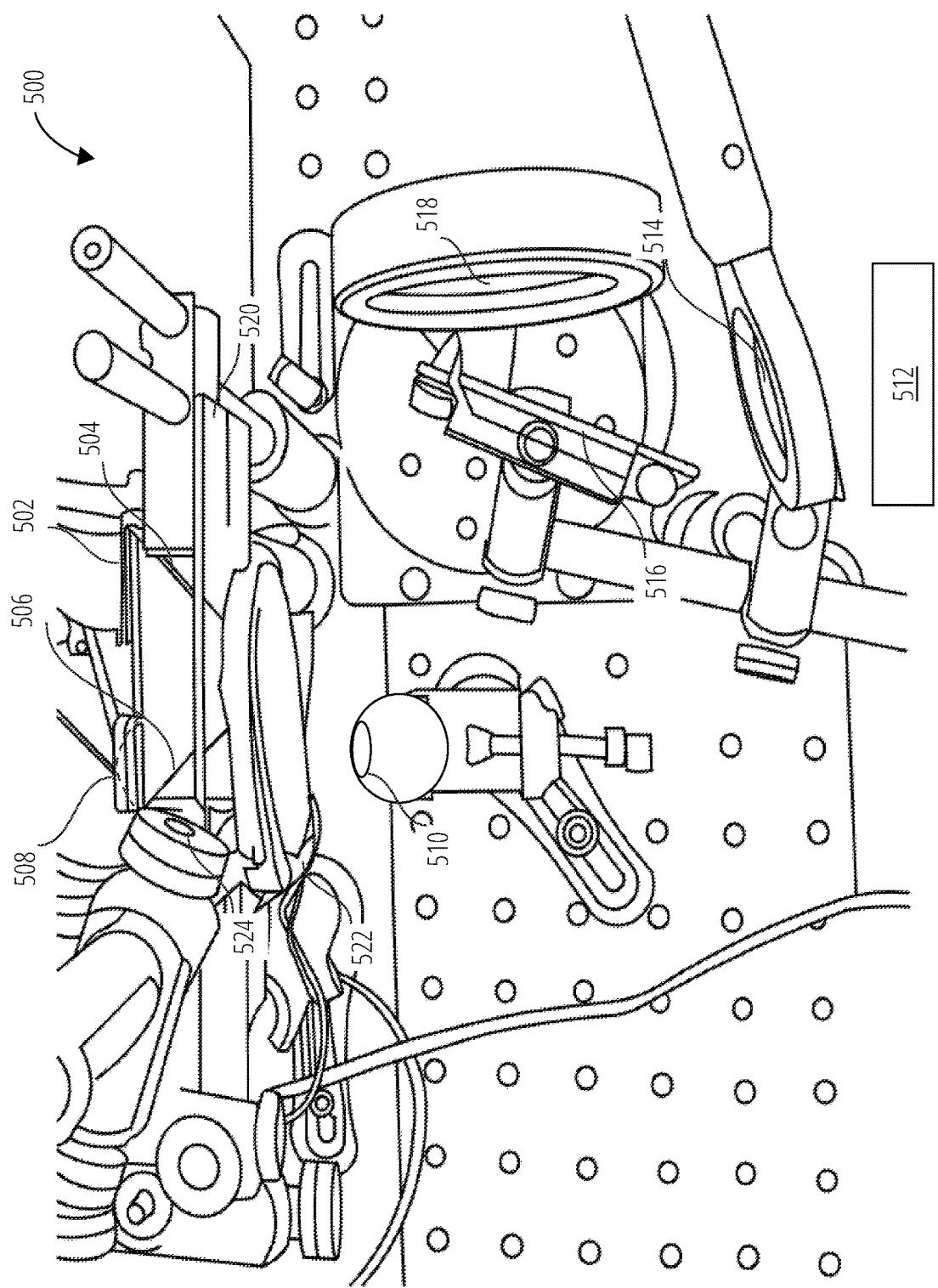
FIG. 5 illustrates an augmented reality display system 500 in accordance with one embodiment.
Figure 6:
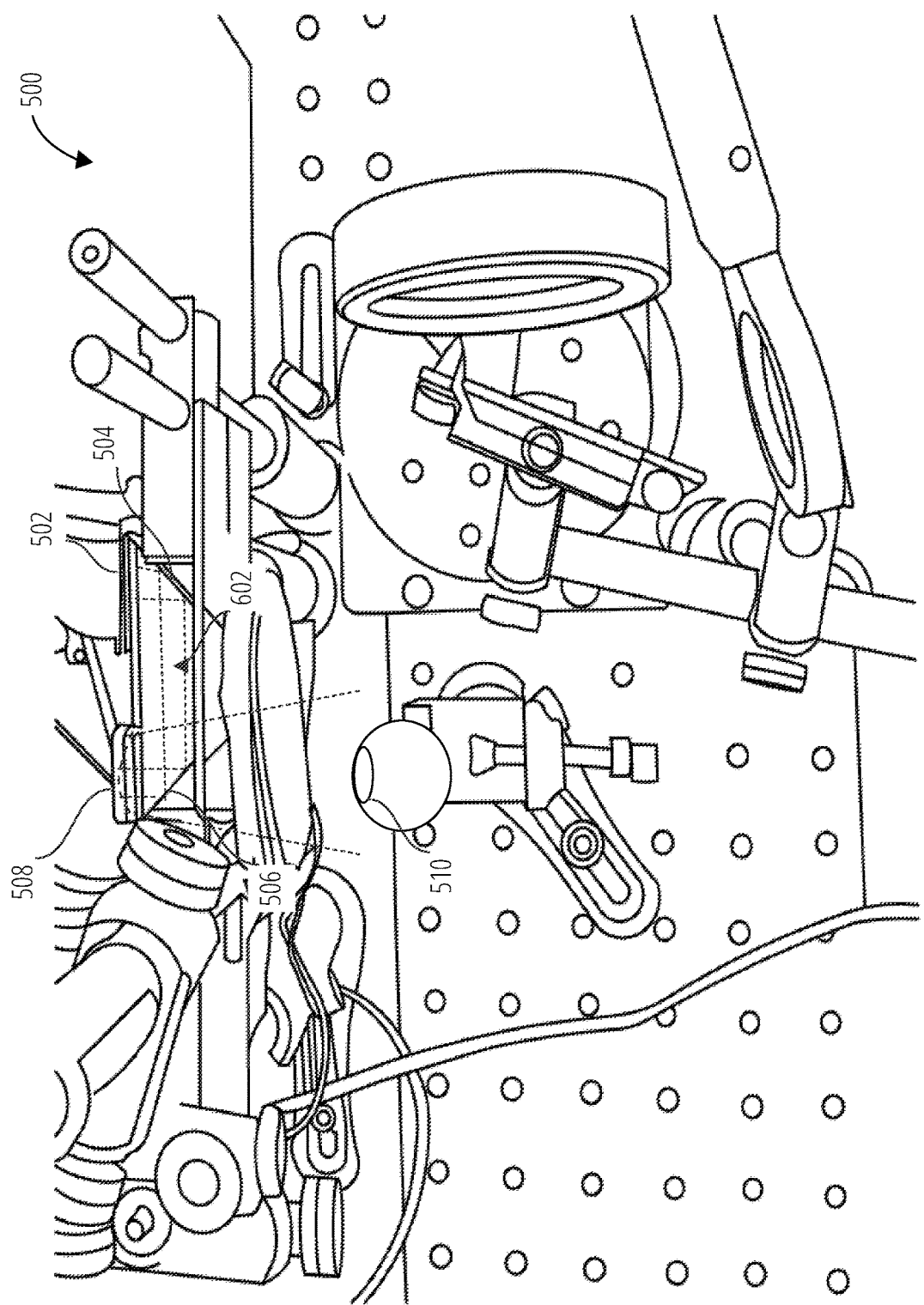
FIG. 6 illustrates an augmented reality display system 500 in accordance with one embodiment.
Figure 7:
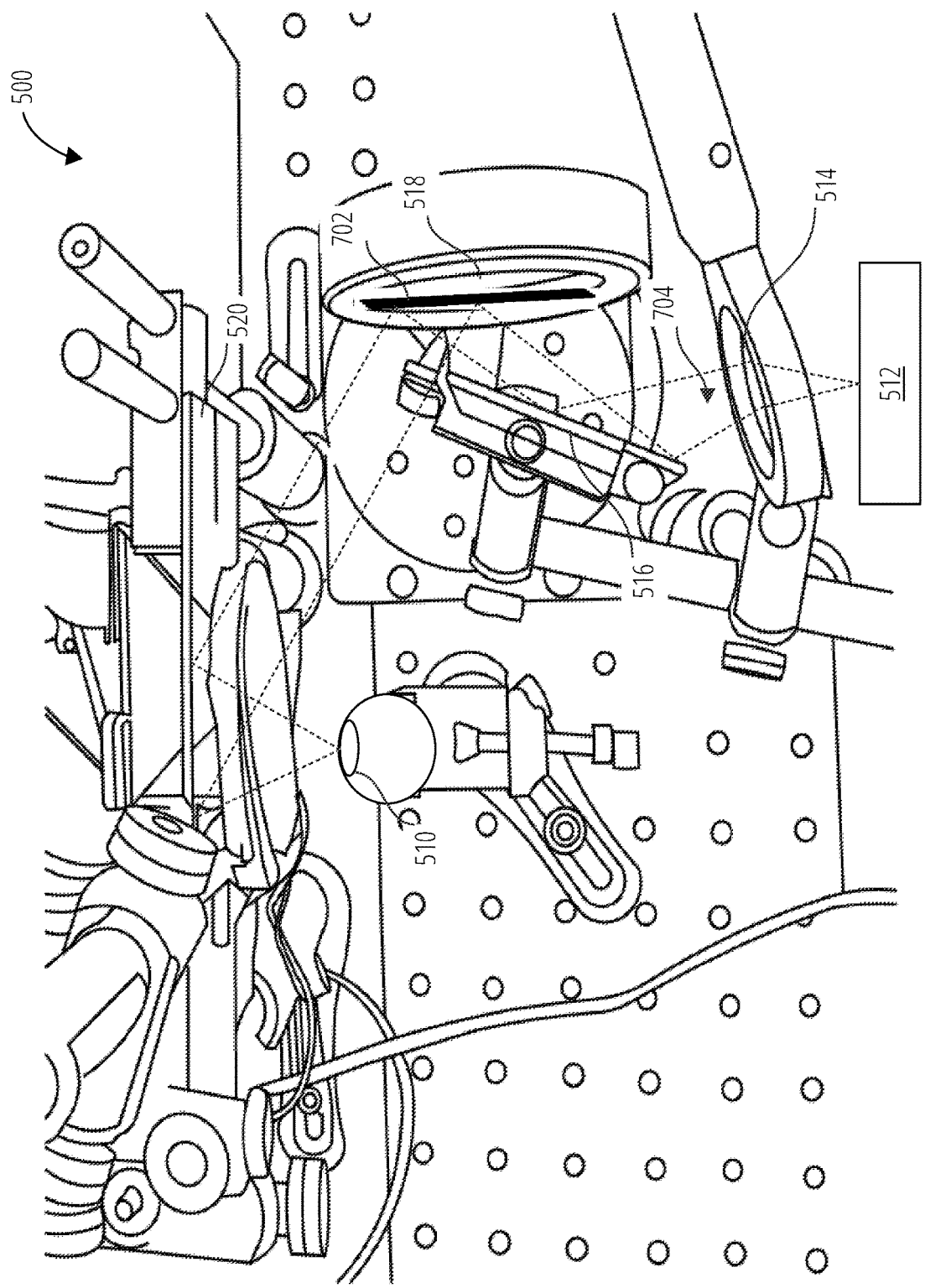
FIG. 7 illustrates an augmented reality display system 500 in accordance with one embodiment.
Figure 8:
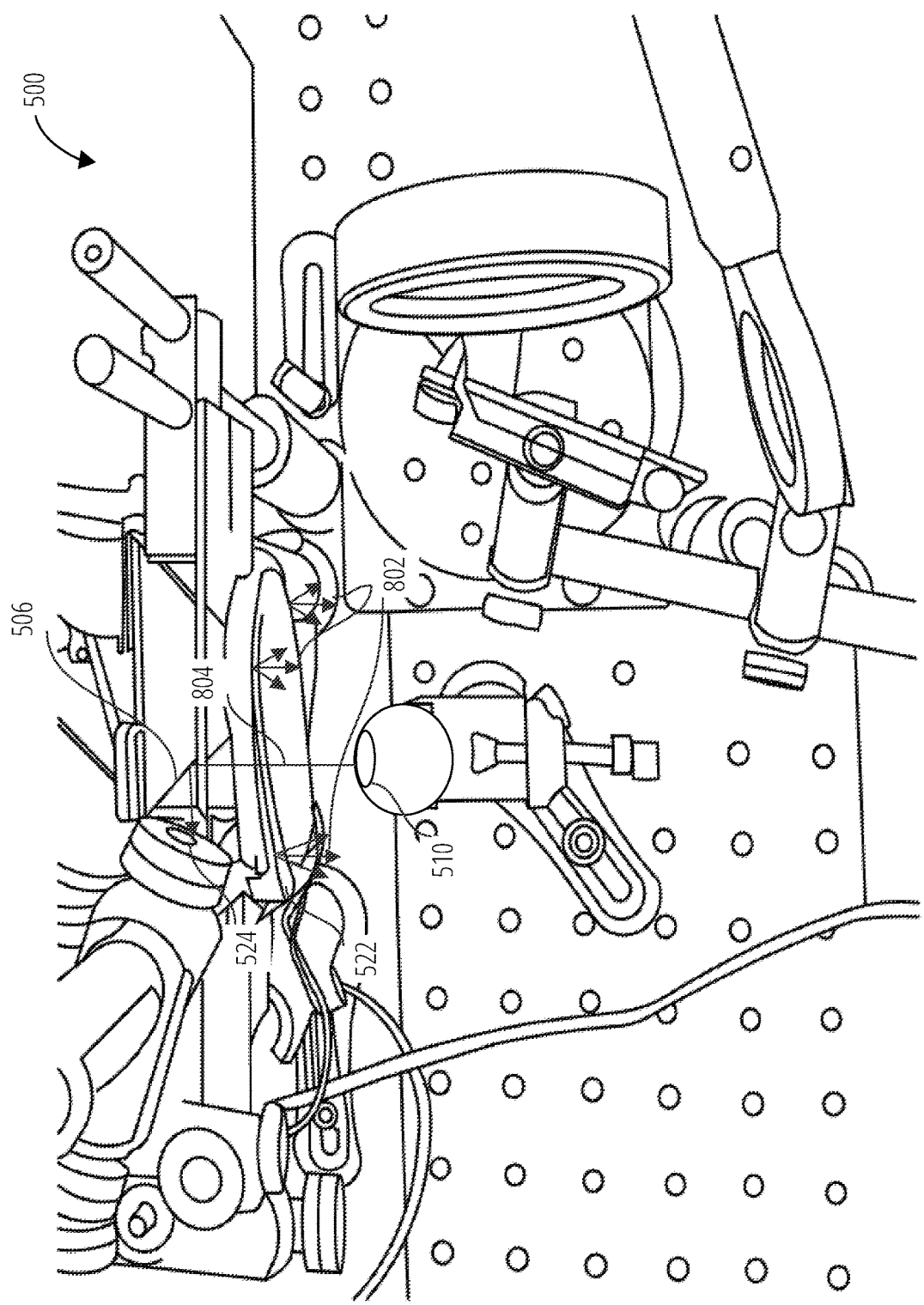
FIG. 8 illustrates an augmented reality display system 500 in accordance with one embodiment.
Figure 9:
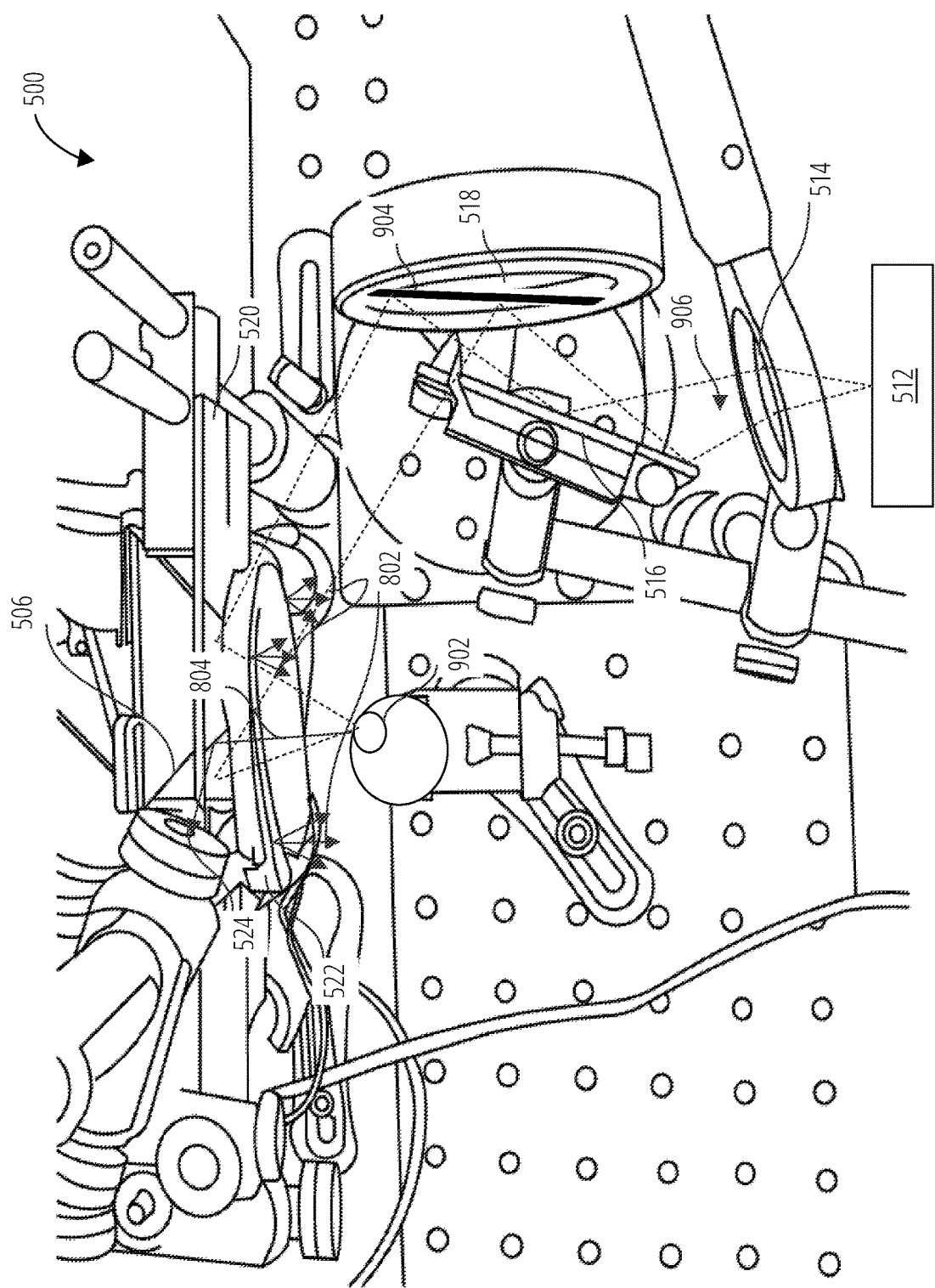
FIG. 9 illustrates an augmented reality display system 500 in accordance with one embodiment.
Figure 10:
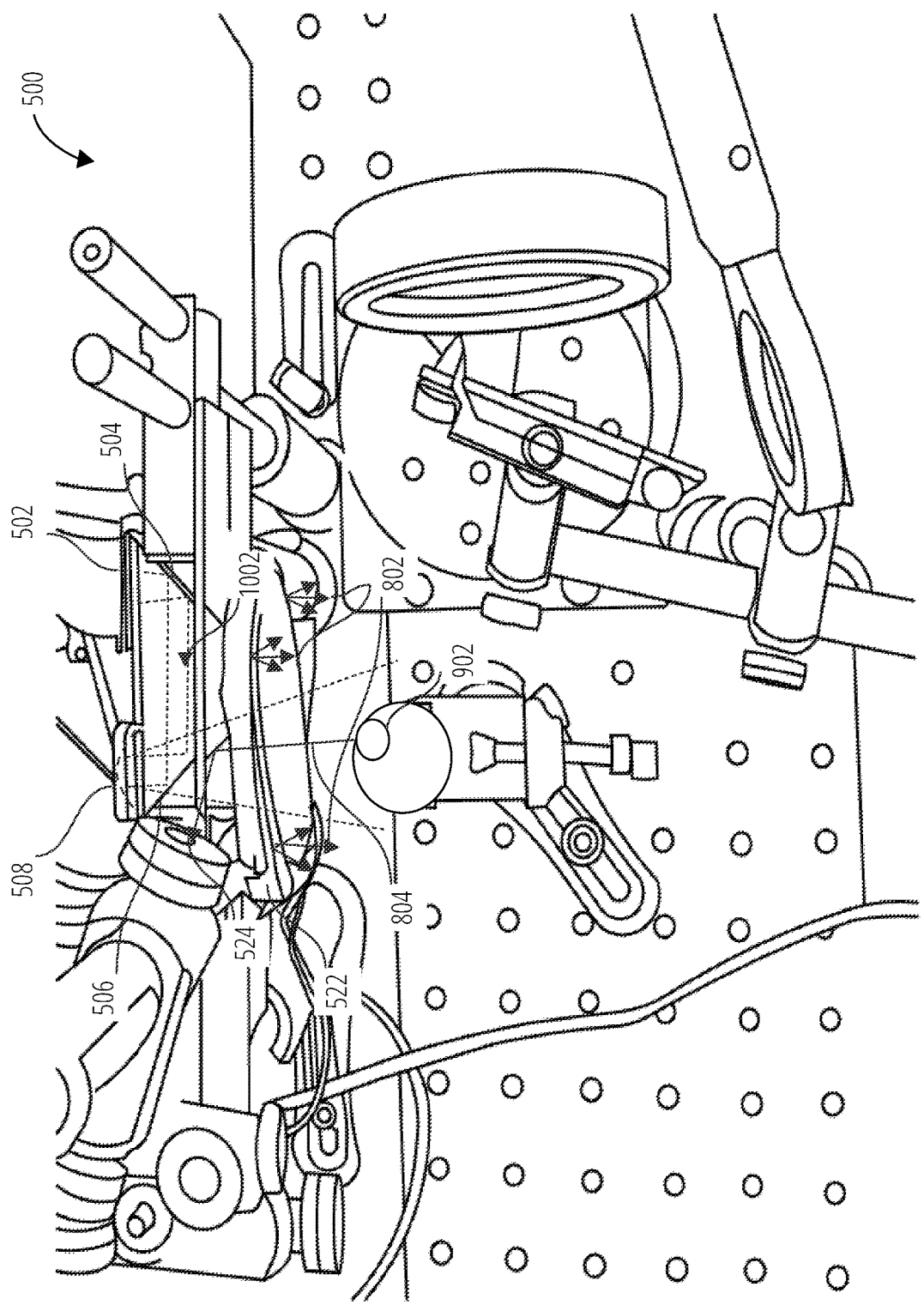
FIG. 10 illustrates an augmented reality display system 500 in accordance with one embodiment.

Additionally, the foveal inset display 106 may include different resulting shapes, such as rectangular (as depicted in FIG. 1), circular (as depicted in FIG. 3 and FIG. 4), etc. The foveal inset display 106 is generated in the area of the field-of-view 102. The foveal inset display 106 is displayed in a higher resolution than the other portion (i.e., the peripheral image) of the field-of-view 102.

In one embodiment, the peripheral image is displayed with about 5 pixels per degree (ppd) resolution, while the foveal inset display 106 is displayed with about 70 ppd resolution. In another embodiment, a different display mode (e.g., 1080p instead of 780p) may achieve higher resolutions for both the foveal inset display 106 and the peripheral image. Yet further embodiments may utilize other display modes. The user may not notice areas of lower resolution (the peripheral image) because they are located in the periphery of the user. The resultant foveated display is then directed toward the user's eye or eyes.

Figure 2:
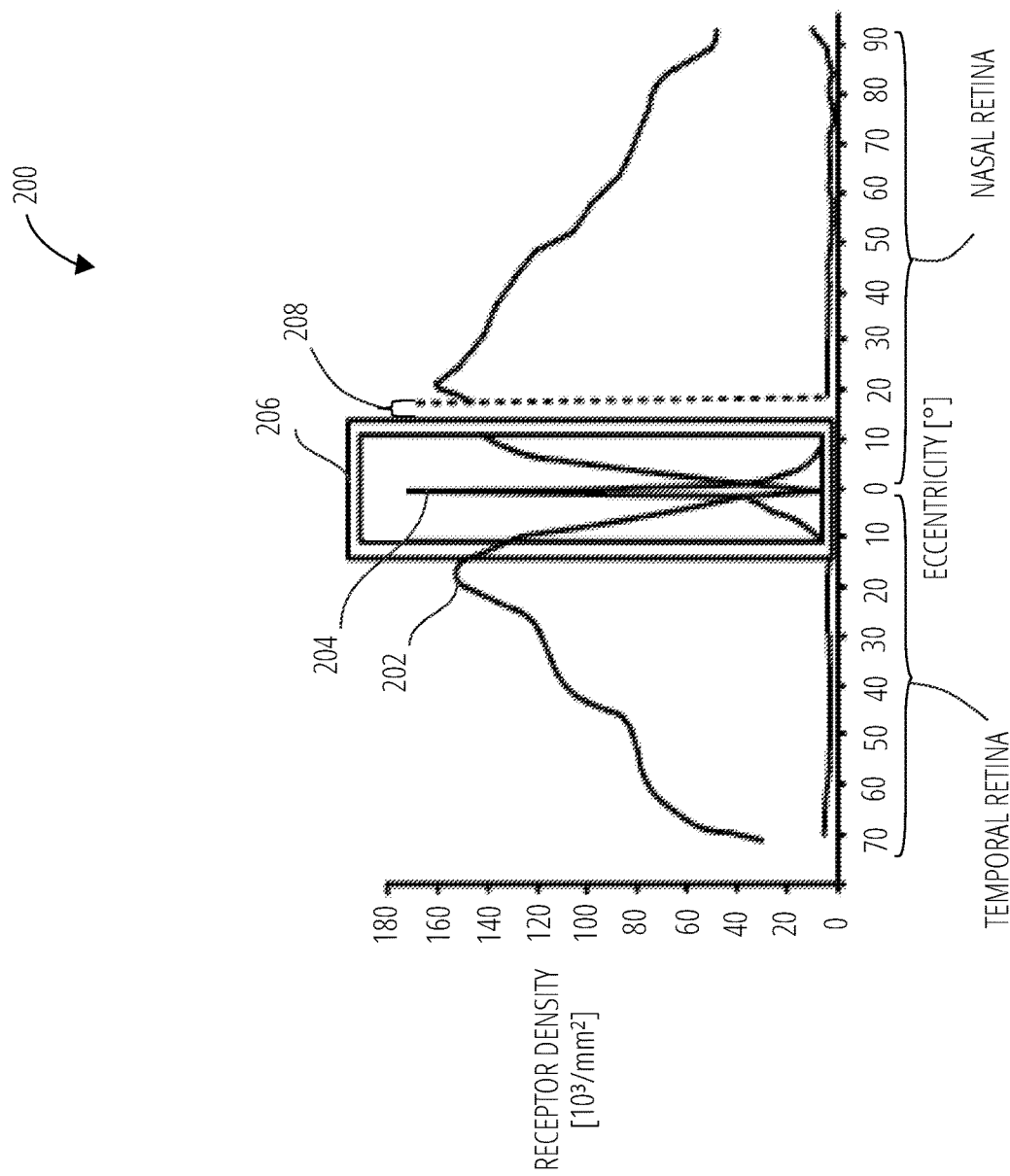
FIG. 2 illustrates a diagram 200 in accordance with one embodiment.

Referring to FIG. 2, a diagram 200 comprises a rod receptor density 202, a cone receptor density 204, a fovea region 206, and an optic disc 208.

The diagram 200 depicts the rod receptor density 202 and the cone receptor density 204 as a function of the retinal eccentricity in degrees. The rod receptor density 202 is highest at an eccentricity that is about and greater than the eccentricity of the edge of the fovea region 206. The cone receptor density 204 is highest at about the midpoint of the fovea region 206. The fovea region 206 is a region of the eye in which the vision field is seen in high resolution. As depicted, the fovea region 206 has an eccentricity of about 15° in either the nasal or temporal direction. The size of the foveal inset display may be based on this eccentricity of the fovea region 206. Additionally, the human eye has an optic disc 208, the attachment point of the optic nerve, in which there are neither cones nor rods. This results in a blind spot for the human eye.

Referring to FIG. 3, a foveated display 300 comprises a tracked gaze 302, a fovea region 304, a peripheral region 306, a field-of-view 308, a foveal inset 310, and a peripheral display 312.

The tracked gaze 302 is utilized to determine the location of the fovea region 304. The fovea region 304 may be the center of the tracked gaze 302 and a number of degrees from that center point. For example, the fovea region 304 may be 30° from the center point. The peripheral region 306 may then comprise the portion of the tracked gaze 302 that is not the fovea region 304.

The fovea region 304 and the peripheral region 306 are utilized to determine the portions of the field-of-view 308 of the foveated display 300 for the foveal inset 310 and the peripheral display 312, respectively. The portion of the field-of-view 308 corresponding to the fovea region 304, that is, the foveal inset 310, may then be displayed at a higher resolution, such as about 66.9 ppd. The portion of the field-of-view 308 corresponding to the peripheral region 306, that is, the peripheral display 312, may then be displayed at a lower resolution, such as about 5.0 ppd. In another embodiment, a different display mode (e.g., 1080p instead of 780p) may achieve higher resolutions for one or both the foveal inset 310 and the peripheral display 312. Yet further embodiments may utilize other display modes.

Referring to FIG. 4, a foveated display 400 comprises a tracked gaze 402, a fovea region 404, a peripheral region 406, a field-of-view 408, a foveal inset 410, and a peripheral display 412.

The tracked gaze 402 is in a different direction compared to the tracked gaze 302 depicted in FIG. 3. The tracked gaze 402 is utilized to determine the fovea region 404 and the peripheral region 406. The fovea region 404 and the peripheral region 406 determine the foveal inset 410 and the peripheral display 412 of the field-of-view 408, respectively. The foveal inset 410 is a different portion of the field-of-view 408 than the foveal inset 310 of the field-of-view 308, even though the field-of-view 408 and the field-of-view 308 may be similar (as depicted). The foveal inset 410 and the peripheral display 412 may then be displayed on the foveated display 400 at different resolutions, such as about 66.9 ppd and 5.0 ppd, respectively.

Referring to FIG. 5-FIG. 10, an augmented reality display system 500 comprises a micro organic light-emitting diode display 502, a primary mirror 504, a half mirror 506, a concave half mirror 508, a pupil position 510, a laser projector 512, a convex lens 514, a peripheral mirror 516, a steering mirror 518, a lens holographic optical element 520, an infrared light-emitting diode device 522, and a pupil tracker 524.

The depictions in FIG. 5-FIG. 10 are a benchtop embodiment useful for understanding how light rays from the peripheral image and foveal inset are directed to the pupil position and controlled. Headset designs are depicted in later figures and generally will utilize a holographic optical element on a moveable stage, which has advantages as described previously.

The micro organic light-emitting diode display 502 emits light corresponding to the foveal inset, such as the inset image 602. The light emitted may be high resolution. The micro organic light-emitting diode display 502 may receive a control signal to determine the portion of a field-of-view of an image that corresponds to the foveal inset to be emitted. Further control signal may be received by the micro organic light-emitting diode display 502 to move the position of the inset image. For example, in response to the pupil tracker 524 determining the pupil position 510 has changed to the pupil position 902, the micro organic light-emitting diode display 502 may receive a control signal to emit a different inset image (i.e., the inset image 1002 instead of the inset image 602) corresponding to the new position on the field-of-view that the pupil position 902 is directed toward.

A beam path for the inset image 602 and the inset image 1002 is determined by a waveguide comprising the primary mirror 504, the half mirror 506, and the concave half mirror 508. The inset image 602 or inset image 1002 is emitted toward the primary mirror 504. The primary mirror 504 receives the inset image 602 or the inset image 1002 from the micro organic light-emitting diode display 502 and directs the inset image 602 or the inset image 1002 toward the half mirror 506. The half mirror 506 then re-directs the inset image 602 or the inset image 1002 toward the concave half mirror 508. Finally, the concave half mirror 508 disperses the inset image 602 or the inset image 1002 to the pupil position 510 or the pupil position 902, respectively.

The beam path (the primary mirror 504, the half mirror 506, and the concave half mirror 508) act as a magnifier lens for the inset image 602 and the inset image 1002. Both sides of the concave half mirror 508 may be index-matched to ensure that the image of the environment (i.e., the image not processed by the augmented reality display system 500) is not distorted. As the magnifier lens is reflective, a large eye box may be achieved. For example, an eye box of about 10-25 mm horizontal may be achieved. Additionally, the micro organic light-emitting diode display 502 may provide focal cues from a single plane. Varifocal operation, with focal cues from about 40 cm to about infinity, may be achieved by moving the micro organic light-emitting diode display 502 (e.g., up and down in the orientation of the micro organic light-emitting diode display 502 depicted in FIG. 5-FIG. 10). The micro organic light-emitting diode display 502 may be a 720p micro organic light-emitting diode. Such as micro organic light-emitting diode may achieve a foveal inset with about 50-90 ppd resolution and a field-of-view of about 10-20°, for example. In other embodiments, a 1080p micro organic light-emitting diode may also be utilized, which may achieve a higher resolution and a larger field-of-view for the foveal inset. In yet further embodiments, other micro organic light-emitting diodes may be utilized.

The laser projector 512 emits the peripheral image 704 or the peripheral image 906 to be received at the pupil position 510 or the pupil position 902, respectively. The laser projector 512 may emit the peripheral image at a low resolution (e.g., about 5 ppd). The laser projector 512 may be a microelectromechanical (MEM) laser projector. The beam path of the peripheral image 704 and the peripheral image 906 is directed by a waveguide comprising the convex lens 514, the peripheral mirror 516, the steering mirror 518, and the lens holographic optical element 520. The laser projector 512 directs the peripheral image 704 or the peripheral image 906 toward the convex lens 514. The convex lens 514 refracts the peripheral image 704 or the peripheral image 906 to the peripheral mirror 516, which further reflects the peripheral image 704 or the peripheral image 906 to the steering mirror 518. The steering mirror 518 may be tilted to achieve various states, such as the steering mirror position 702 or the steering mirror position 904.

The orientation of the steering mirror 518 shifts the exit aperture of the peripheral display to track the pupil position (e.g., the pupil position 510 and the pupil position 902). Thus, the beam path of the peripheral image 704 and the peripheral image 906 are determined by the orientation of the steering mirror 518. The steering mirror 518 may receive a control signal to determine the steering mirror position. The control signal may be received from the pupil tracker 524. The peripheral image 704 or peripheral image 906 is reflected off the steering mirror 518 toward the lens holographic optical element 520.

The lens holographic optical element 520 operates as a reflective holographic optical element (HOE) image combiner. Image rays originating from the laser projector 512 reflect off the lens holographic optical element 520 and converge to the pupil position. Light from the micro organic light-emitting diode display 502 passes through the back of the lens holographic optical element 520 and combines with the peripheral image light at the pupil position 510. An observer thus perceives a large field-of-view (FOV), "all-in-focus" image including the peripheral image and foveal inset. In one embodiment, an augmented reality display system 500 may provide a single color, 60° instant FOV images. In other embodiments, the augmented reality display system 500 may provide additional colors, including full-color, and/or wider FOV images for the periphery.

The infrared light-emitting diode device 522 comprises one or more infrared light-emitting diodes (LEDs). The LEDs may be positioned on the infrared light-emitting diode device 522 to provide the emitted infrared 802 at multiple angles to a human eye located near the infrared light-emitting diode device 522. The augmented reality display system 500 utilizes a cornea of the human eye as part of the beam path of the emitted infrared 802 inside the waveguide. The emitted infrared 802 reflects off the cornea toward the half mirror 506, which acts as a beam splitter. The emitted infrared 802 becomes the reflected infrared 804. The position of the cornea in the waveguide determines the beam path of the reflected infrared 804. As the cornea is in line with the pupil in the human eye, the reflected infrared 804 may be utilized to determine the pupil position (e.g., the pupil position 510 or the pupil position 902). The half mirror 506 reflects the reflected infrared 804 toward the pupil tracker 524. The pupil tracker 524 receives the reflected infrared 804, which is on-axis with the cornea and pupil. The location that the pupil tracker 524 receives the reflected infrared 804 is then utilized to determine the pupil position, as each pupil position results in the pupil tracker 524 receiving the reflected infrared 804 at a different location. Once the pupil position is determined, control signals may be sent to the micro organic light-emitting diode display 502 and the steering mirror 518 (or to a moveable stage controller, in later-described embodiments).

The control signals may determine the foveal inset emitted by the micro organic light-emitting diode display 502, move the position of the emission of the foveal inset by the micro organic light-emitting diode display 502 or change the image region it generates, determine the peripheral image emitted by the laser projector 512, and alter the steering mirror position (or move the position of the holographic optical element, in later-described embodiments) to position the exit aperture of the peripheral display. Altering the position of the exit aperture of the peripheral display may result in reduced vignetting.

Figure 11:
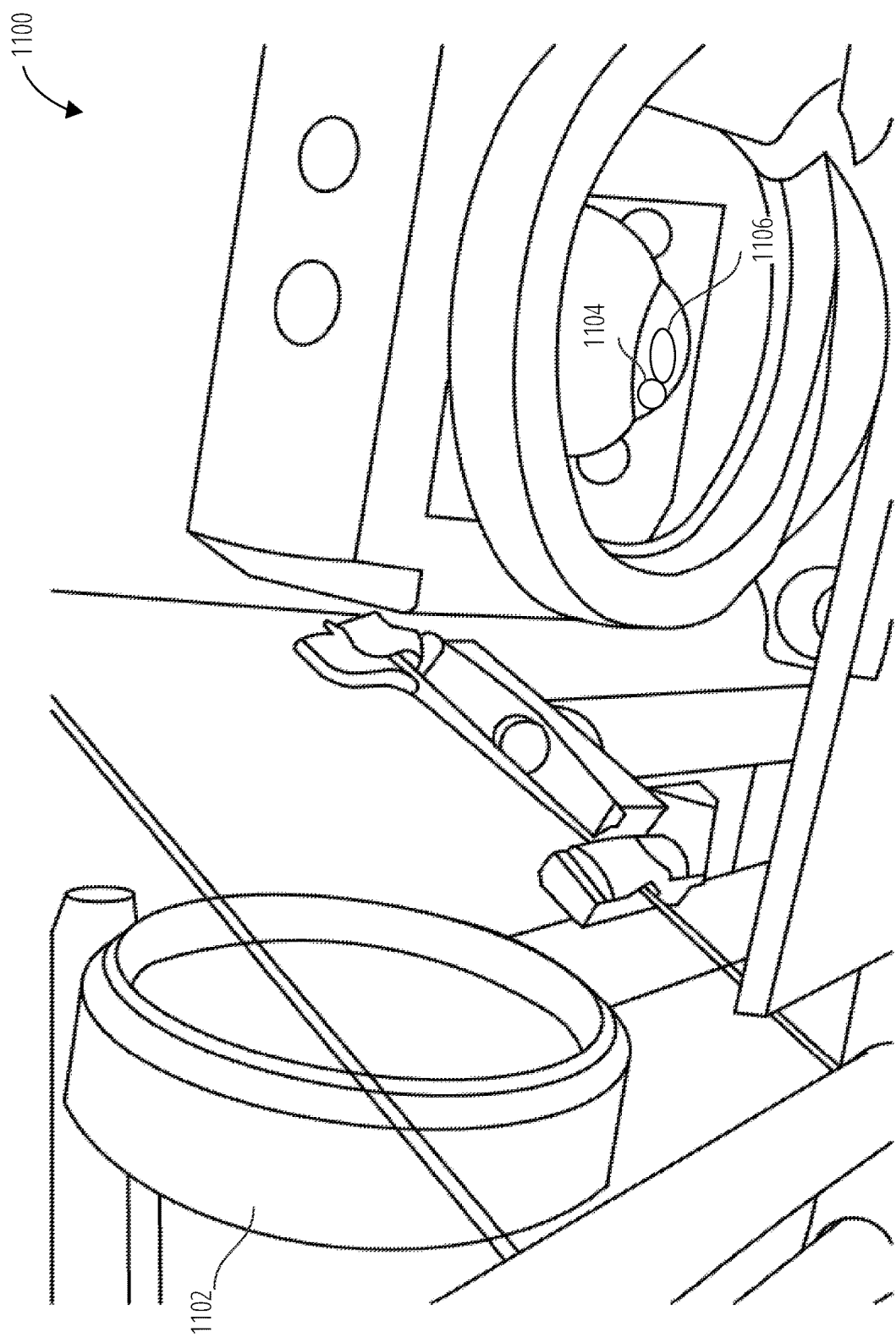
FIG. 11 illustrates a peripheral display apparatus 1100 in accordance with one embodiment.

Referring to FIG. 11, a peripheral display apparatus 1100 comprises a scanning primary mirror 1102, a Maxwellian viewpoint 1104, and an eye pupil 1106.

The scanning primary mirror 1102, also referred to as a steering mirror, reflects an image as part of a waveguide. For example, the image may be the peripheral image. The reflection of the image through the waveguide results in the Maxwellian viewpoint 1104. The Maxwellian viewpoint 1104 may be within the angular tolerance of the reflective holographic optical element, which may comprise a part of the waveguide for the image. The orientation of the scanning primary mirror 1102 may be altered to adjust the Maxwellian viewpoint 1104. For example, the scanning primary mirror 1102 may be adjusted such that the Maxwellian viewpoint 1104 aligns with the eye pupil 1106. The scanning primary mirror 1102 may receive a control signal from a pupil tracker to determine the orientation of the scanning primary mirror 1102, thus shifting the Maxwellian viewpoint 1104. As the pupil position changes, the pupil tracker sends additional control signals to alter the Maxwellian viewpoint 1104. Such control signals are generated to maintain the Maxwellian viewpoint 1104 on the eye pupil 1106.

Figure 12:
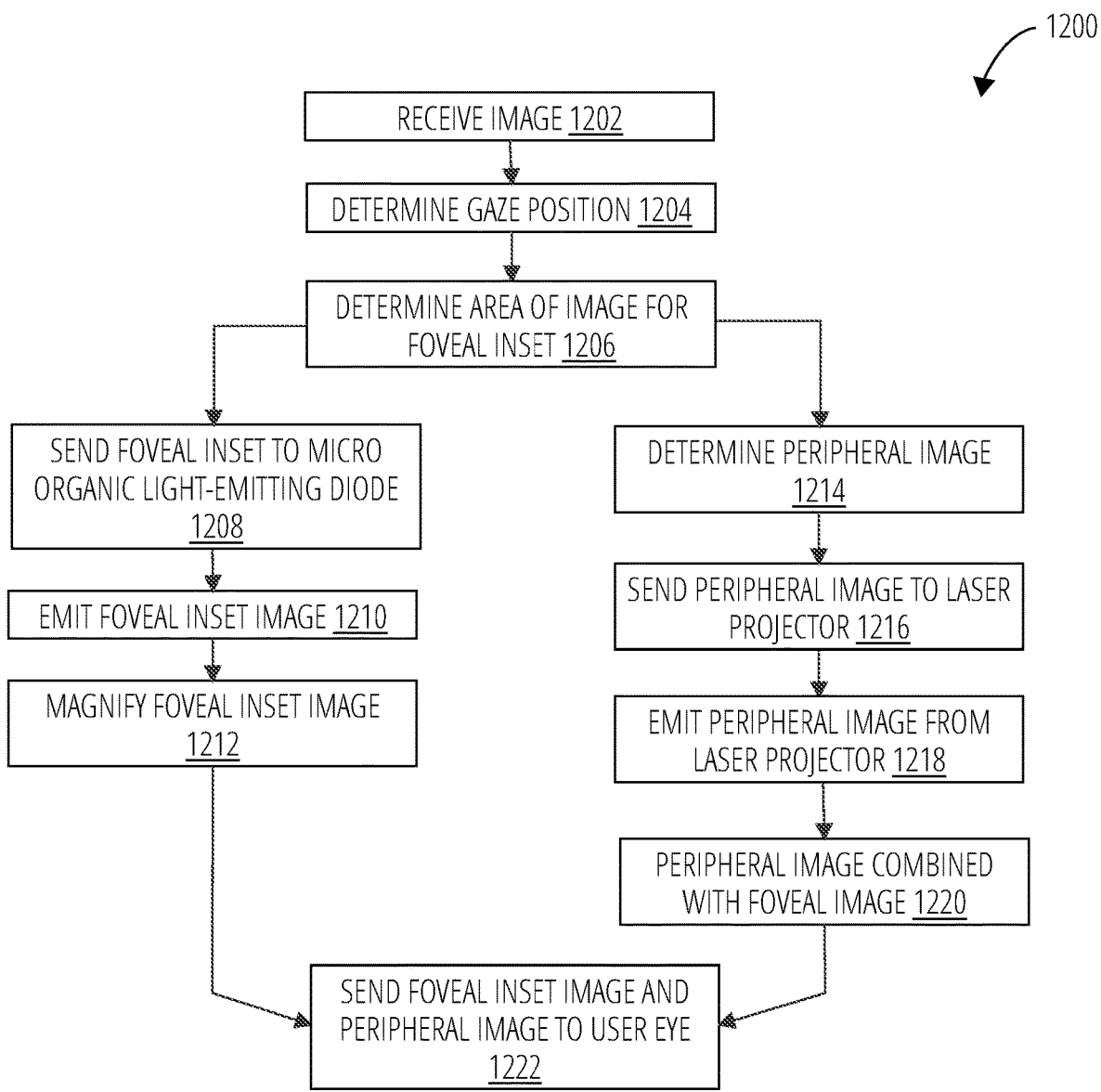
FIG. 12 illustrates a foveated display method 1200 in accordance with one embodiment.

Referring to FIG. 12, a foveated display method 1200 receives an image (block 1202). The image may be an augmented reality display. The gaze position is then determined (block 1204). The gaze tracking and utilization method 1300 depicted in FIG. 13 may be utilized. The area of the image for the foveal inset is determined (block 1206). The foveal inset may subtend a number of degrees of eccentricity from the gaze position. For example, the number of degrees may be about 10-20°. Furthermore, the foveal inset may have various shapes, such as rectangular (as depicted in FIG. 1), circular (as depicted in FIG. 3 and FIG. 4), etc. The peripheral image is also determined. The foveal inset image information is sent to a micro organic light-emitting diode display device (block 1208) for conversion into photons. (Other types of display devices could be utilized instead). The micro organic light-emitting diode device emits the light image of the foveal inset (block 1210). All or a portion of the micro organic light-emitting diode device may be utilized. The foveal inset image is magnified (block 1212). The beam path of the foveal inset image emitted by the micro organic light-emitting diode device is directed through a waveguide, which may comprise components that act to magnify the foveal inset image, and passes through a transparent backplane of a holographic optical element. The peripheral image is determined (block 1214). In some embodiments, the peripheral image is the entire available image. In other embodiments, the peripheral image is the portion of the image that is not the foveal inset image. The peripheral image information is sent to a laser projector (block 1216). The peripheral image is emitted from laser projector (block 1218) and reflects off the holographic optical element. The peripheral image is then combined with the foveal inset at the output (front face) of the holographic optical element (block 1220).

The peripheral image is converged to a Maxwellian viewpoint. The foveal inset image combined with the peripheral image are sent to an eye of the user (block 1222). Each of the foveal inset image and the peripheral image have a separate waveguide to determine their beam paths. These beam paths may be altered by components of the waveguides. Control signals from a pupil tracker may be utilized to alter the components of the waveguides, as described previously. The gaze tracking and utilization method 1300 depicted in FIG. 13 may be utilized to generate the control signals.

Figure 13:
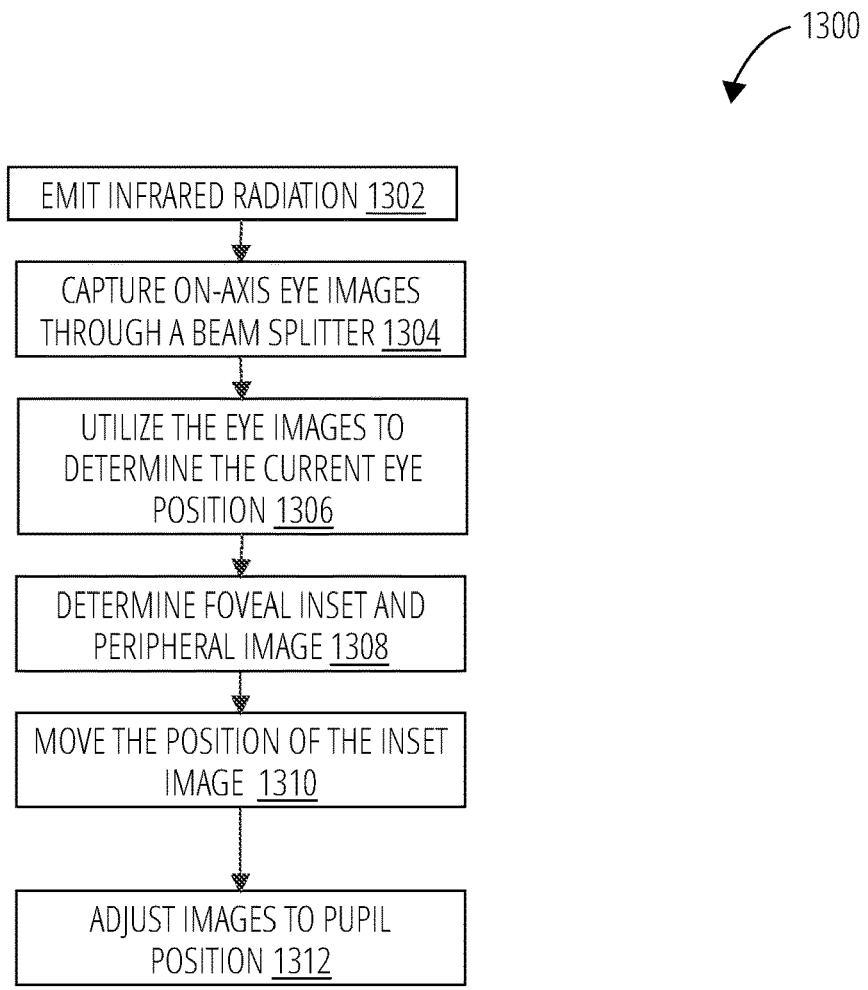
FIG. 13 illustrates a gaze tracking and utilization method 1300 in accordance with one embodiment.
Figure 14:
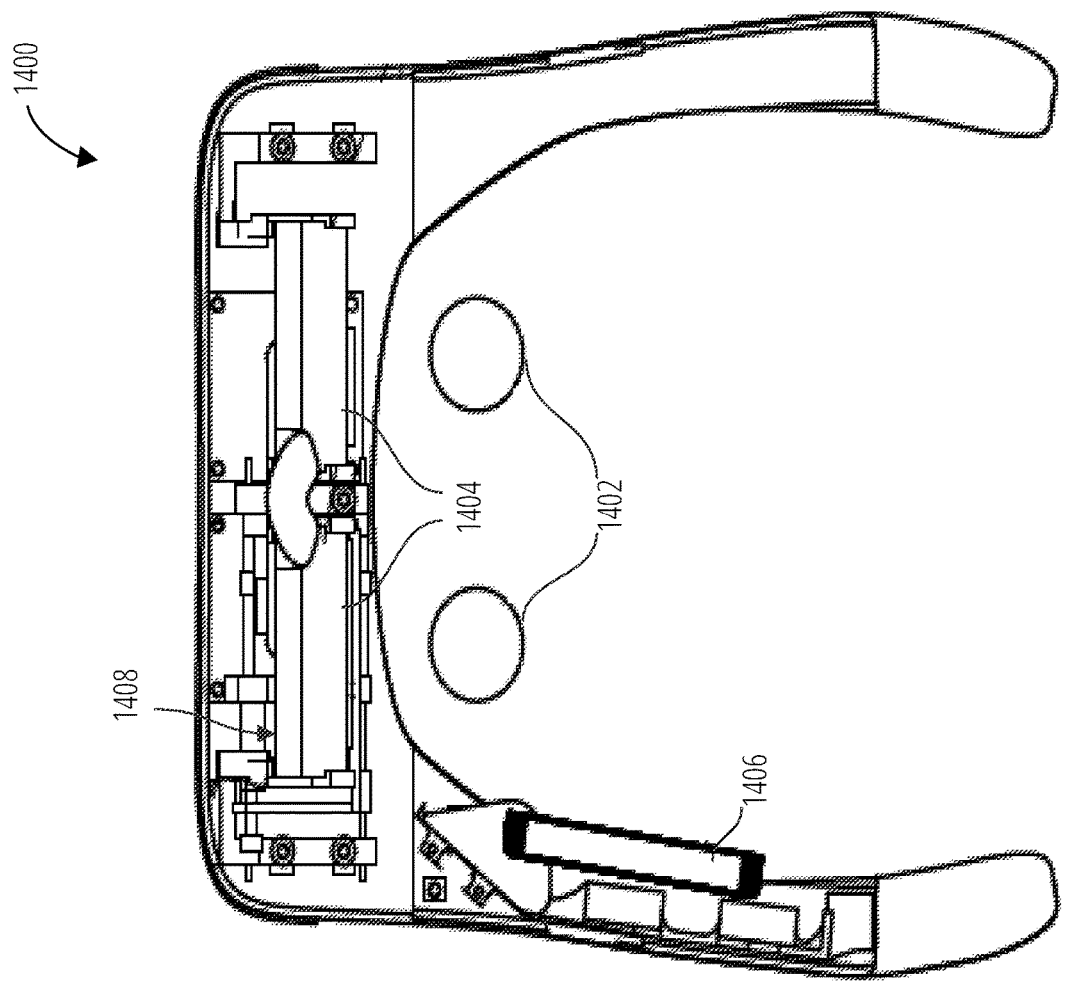
FIG. 14 illustrates an augmented reality foveated display headset 1400 in accordance with one embodiment.
Figure 15:
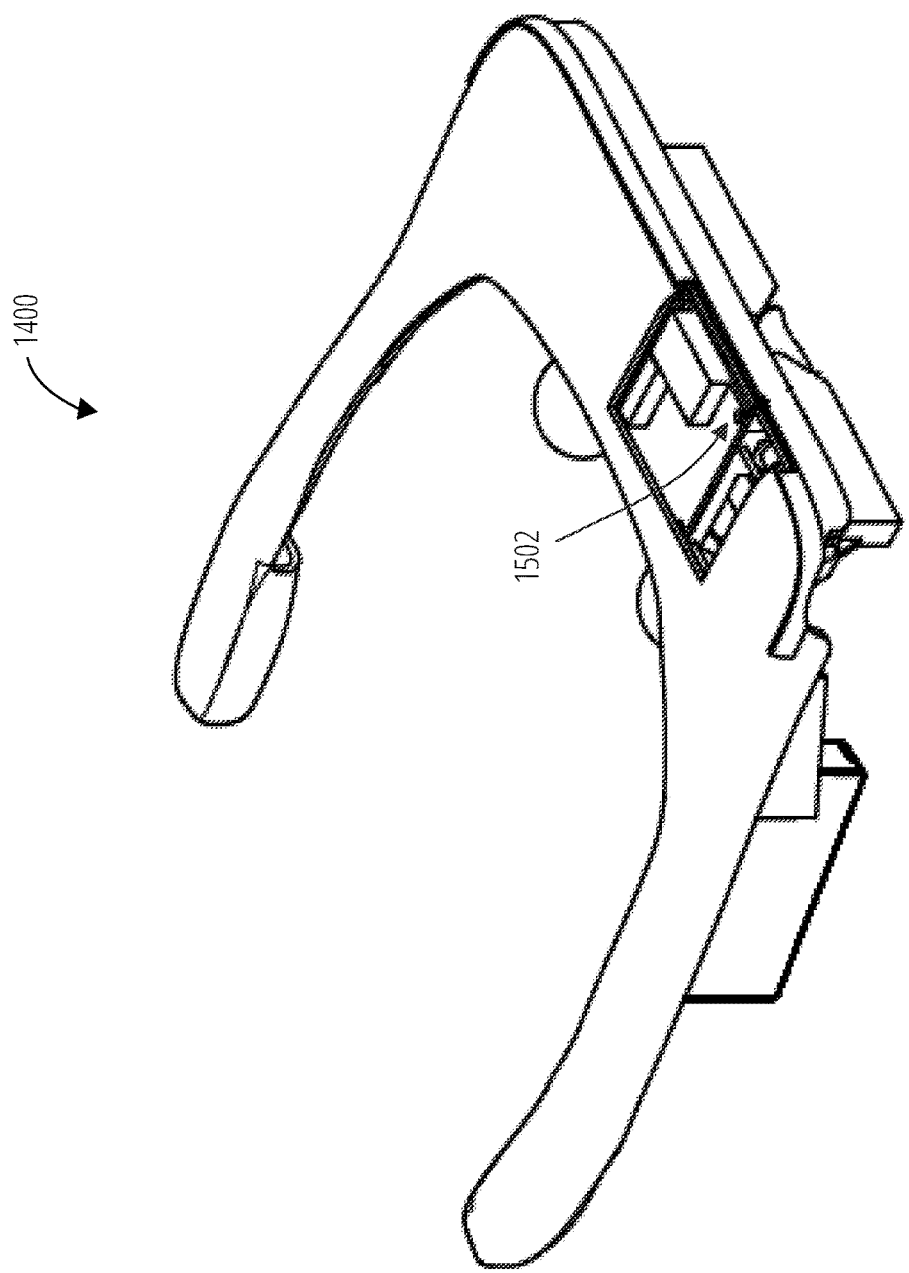
FIG. 15 further illustrates an augmented reality foveated display headset 1400 in accordance with one embodiment.
Figure 16:
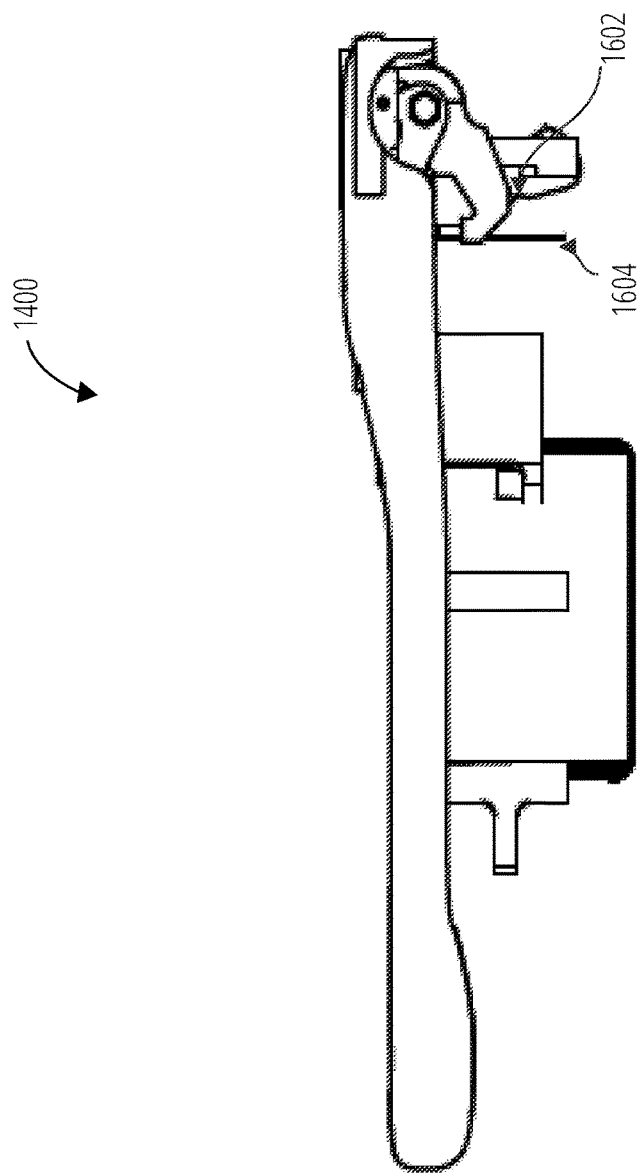
FIG. 16 further illustrates an augmented reality foveated display headset 1400 in accordance with one embodiment.
Figure 17:
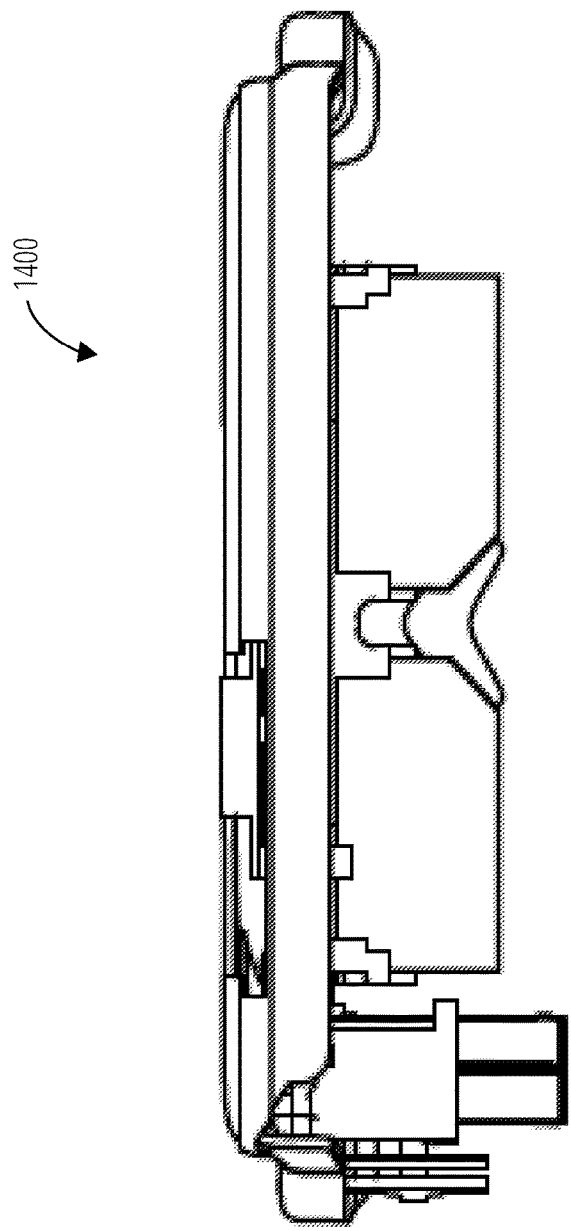
FIG. 17 further illustrates an augmented reality foveated display headset 1400 in accordance with one embodiment.

Referring to FIG. 13, a gaze tracking and utilization method 1300 emits infrared radiation (block 1302). The infrared radiation may be emitted from one of more infrared LEDs. The infrared LEDs may be components of an infrared light-emitting diode device. The infrared may be emitted in multiple directions. On-axis eye images are captured through a beam splitter (block 1304). A gaze tracker may be utilized to receive and capture the infrared radiation. The infrared radiation may have been reflected off of a cornea and a beam splitter. The gaze tracker and the waveguide components for the infrared beam may be configure such that on-axis images are captured. An on-axis image may be utilized to determine the pupil position and thus the gaze position. The eye images are utilized to determine the current eye position (block 1306). Different eye positions (i.e., pupil position) result in the on-axis image being captured at different location on the gaze tracker.

Other embodiments may utilize a single-angle off-axis capture of the gaze, or more generally multiple off-axis capture or a combination of off- and on-axis capture. The disclosed mechanisms are not limited to on-axis gaze capture techniques.

Figure 18:
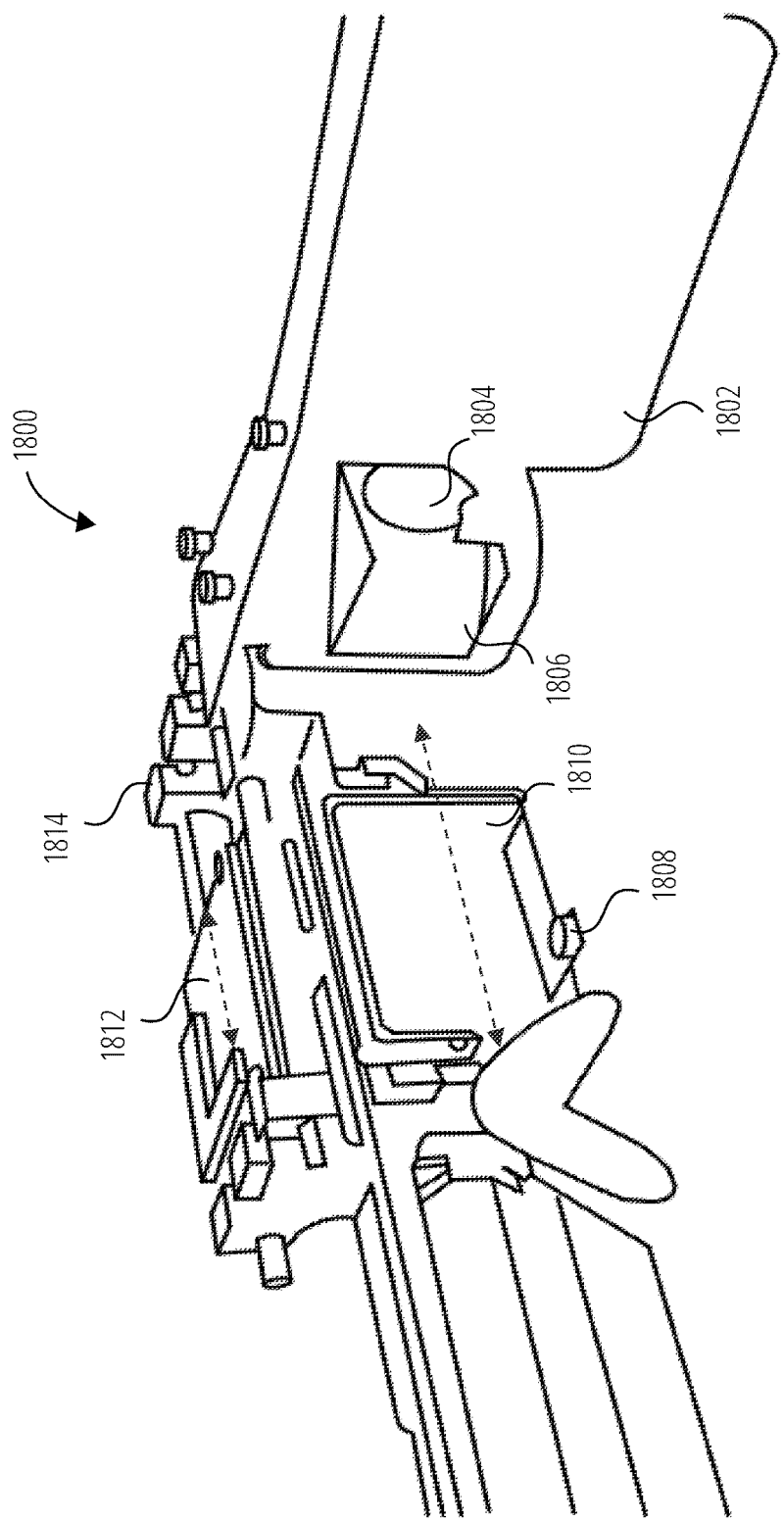
FIG. 18 illustrates an augmented reality foveated display headset 1800 in accordance with one embodiment.
Figure 19:
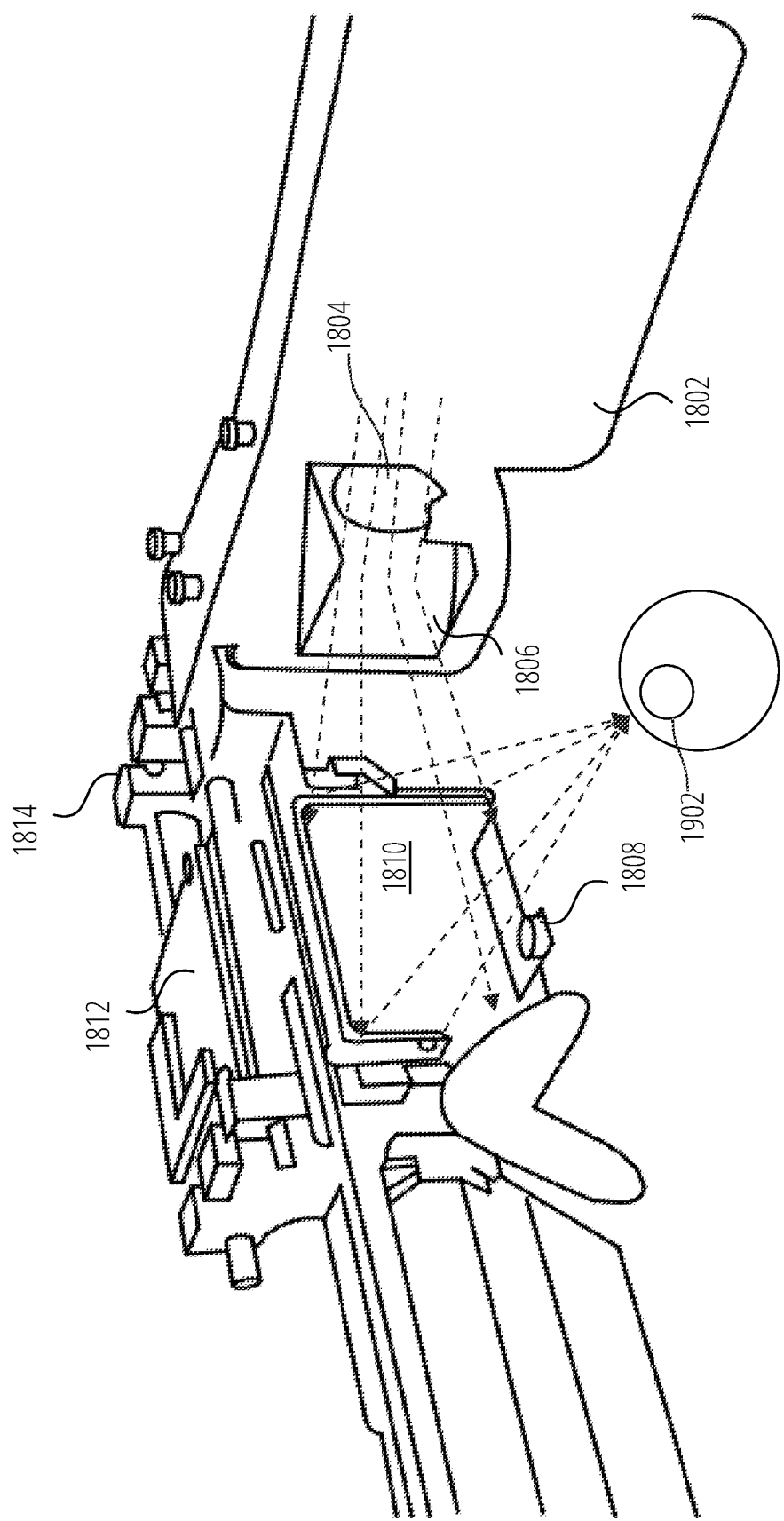
FIG. 19 further illustrates the augmented reality foveated display headset 1800 in accordance with one embodiment.
Figure 20:
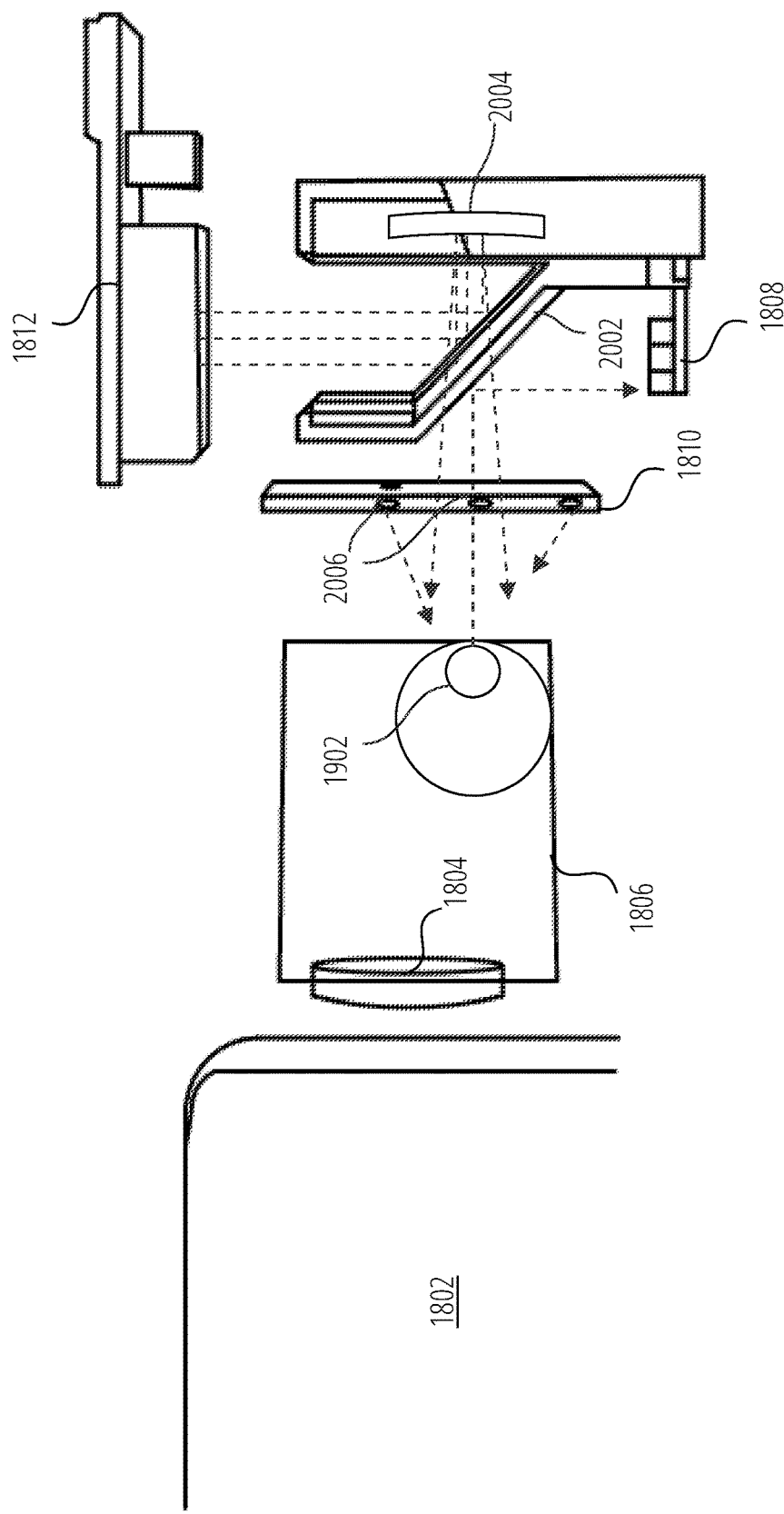
FIG. 20 further illustrates an augmented reality foveated display headset 1800 in accordance with one embodiment.

The gaze tracker, or another component, may be configured to determine the pupil position from the capture location. For example, an image captured at the center of the gaze tracker may indicate that the pupil position is oriented in a first direction, such as straight-ahead. Other image capture locations may be a deviation from this first direction. To further the example, a pupil position corresponding to an eye looking right of the straight-ahead position may result in the image being captured on the gaze tracker to the right of center. The magnitude of the deviation may determine the magnitude that the pupil position has deviated from the straight ahead position. The gaze tracker may be configured to determine each pupil position for each image capture location. The foveal inset and the peripheral image are then determined (block 1308). The capture location and thus pupil position determine the center point of a gaze position on an image. An eccentricity in degrees may then be applied from the center point to generate the foveal inset, which is a region of the image that is to be projected with a higher resolution than the other part of the image (i.e., the peripheral image). The eccentricity to determine the foveal inset may be about 19.1° (this is merely a specific example). The position of the inset image is moved on a micro organic light-emitting diode according to the pupil position (block 1310). As the foveal inset from the micro organic light-emitting diode may cover a larger region than the fovea region of a user, the position of the inset image on the micro organic light-emitting diode may be moved. Such a move may alter the beam path of the foveal inset image emitted by the micro organic light-emitting diode. The micro organic light-emitting diode may receive a control signal from the pupil tracker to determine the position of the inset image. Finally, the exit aperture of the peripheral image is adjusted (block 1312). The gaze tracker may send a control signal to a moveable stage to adjust the position of the holographic optical element (or the orientation of a steering mirror). This adjusts the beam path, and the Maxwellian viewpoint, of the peripheral image. The Maxwellian viewpoint may be adjusted to send the peripheral image to the pupil position. Each pupil position may have a corresponding setting to adjust the Maxwellian viewpoint to the pupil position. FIG. 18-FIG. 20 depict a headset embodiment in which a steering mirror is not used and a moveable stage is operated to direct the foveal inset to the pupil position.

As previously pointed out, the use of a moveable stage to translate the position of the holographic optical element and change the Maxwellian viewpoint may generally be preferable over use of a steering mirror due to generating a significantly expanded eye box.

FIG. 14-FIG. 17 illustrate an augmented reality foveated display headset 1400 for which eye locations 1402 align with a gaze tracker 1404. The augmented reality foveated display headset 1400 comprises a peripheral display light engine 1406, a beam splitter 1602, and a holographic optical element 1604. The augmented reality foveated display headset 1400 further comprises a foveal inset light engine 1502 and a moveable stage 1408. The use of these components is described further in conjunction with FIG. 18-FIG. 20.

FIG. 18 illustrates an augmented reality foveated display headset 1800 in one embodiment. The augmented reality foveated display headset 1800 comprises a projector 1802, a convex lens 1804, a prism 1806, an eye tracking camera 1808, a lens holographic optical element 1810, a micro organic light-emitting diode display 1812, and a moveable stage 1814. Depending on the embodiment, the moveable stage 1814 enables positioning of the lens holographic optical element 1810 and micro organic light-emitting diode display 1812 horizontally, vertically, and/or depth wise. The ability to position the lens holographic optical element 1810 and micro organic light-emitting diode display 1812 (and thus the position of the foveal inset) based on pupil tracking may result in a larger eye box than is possible in conventional headset devices, for example 10× or greater improvement in eye box area.

The projector 1802 is used to generate the peripheral region of the augmented reality image by generating light rays that are directed by the prism 1806 (or a mirror) to the lens holographic optical element 1810, which reflects the rays to the pupil position 1902. The foveal inset portion of the augmented reality image is generated from the micro organic light-emitting diode display 1812 which directs light rays to the half mirror 2002, which reflects the rays to the concave half mirror 2004, which in turn reflects the rays through the lens holographic optical element 1810 to the pupil position 1902. For gaze tracking, infrared light-emitting diodes 2006 positioned on the lens holographic optical element 1810 direct infrared light to the pupil position 1902 of the user's eye. The infrared rays are reflected off the user's eye, through the lens holographic optical element 1810, to an eye tracking camera 1808. The eye tracking camera 1808 inputs the reflected light information to logic that determines a position for the micro organic light-emitting diode display 1812 and/or lens holographic optical element 1810 and operates the moveable stage 1814 to position the micro organic light-emitting diode display 1812 and/or lens holographic optical element 1810 to improve positioning of the foveal inset on composite augmented reality images perceived by the user.

Figure 21:
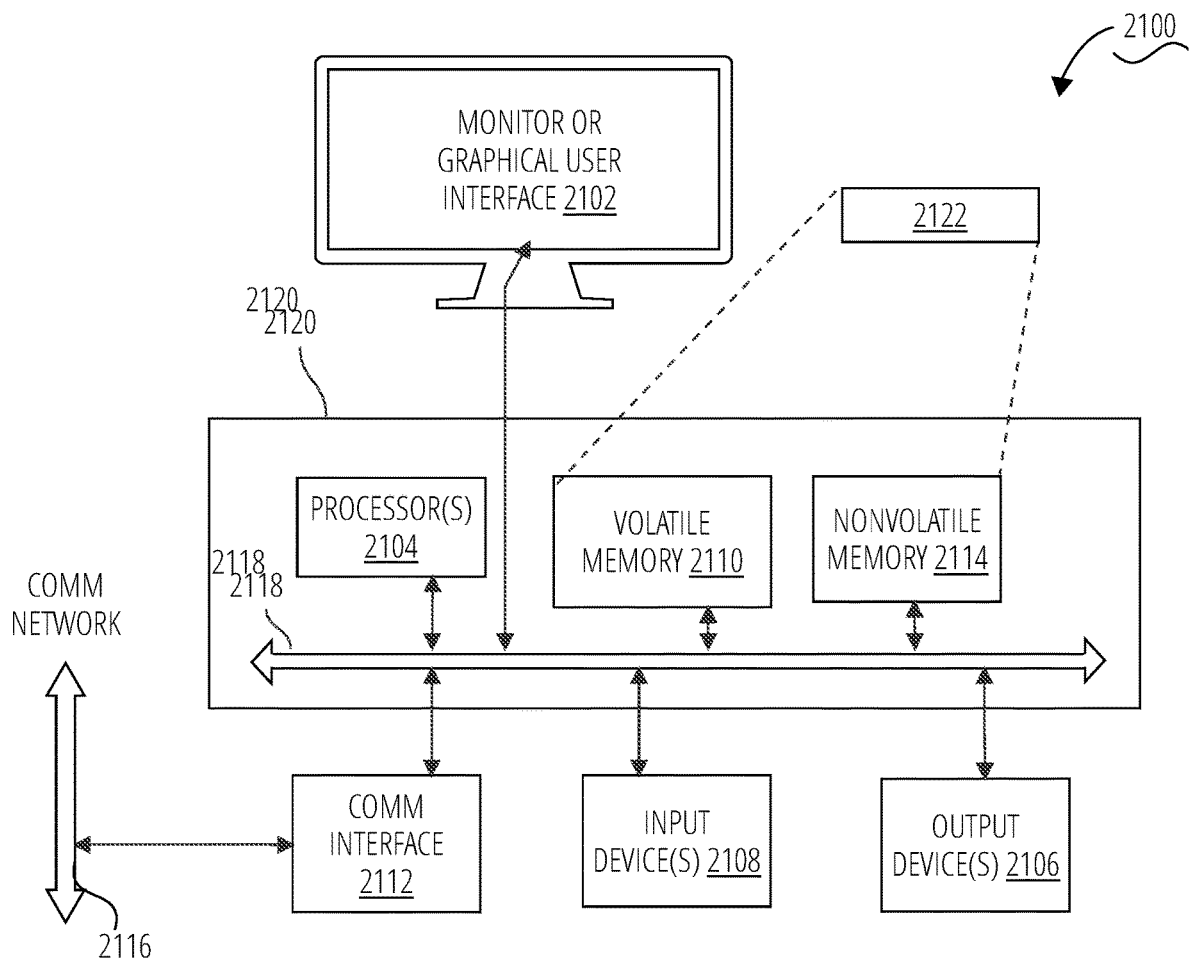
FIG. 21 is an example block diagram of a computing device 2100 that may incorporate embodiments of the present invention.

FIG. 21 is an example block diagram of a computing device 2100 that may incorporate embodiments of the present invention. FIG. 21 is merely illustrative of a machine system to carry out aspects of the technical processes described herein, and does not limit the scope of the claims. One of ordinary skill in the art would recognize other variations, modifications, and alternatives. In one embodiment, the computing device 2100 typically includes a monitor or graphical user interface 2102 (this may be the holographic optical element), a data processing system 2120, a communication network interface 2112, input device(s) 2108, output device(s) 2106, and the like.

As depicted in FIG. 21, the data processing system 2120 may include one or more processor(s) 2104 that communicate with a number of peripheral devices via a bus subsystem 2118. These peripheral devices may include input device(s) 2108, output device(s) 2106, communication network interface 2112, and a storage subsystem, such as a volatile memory 2110 and a nonvolatile memory 2114.

The volatile memory 2110 and/or the nonvolatile memory 2114 may store computer-executable instructions and thus forming logic 2122 that when applied to and executed by the processor(s) 2104 implement embodiments of the processes disclosed herein.

The input device(s) 2108 include devices and mechanisms for inputting information to the data processing system 2120. These may include a keyboard, a keypad, a touch screen incorporated into the monitor or graphical user interface 2102, cameras, audio input devices such as voice recognition systems, microphones, and other types of input devices. In various embodiments, the input device(s) 2108 may be embodied as a computer mouse, a trackball, a track pad, a joystick, wireless remote, drawing tablet, voice command system, eye tracking system, and the like. The input device(s) 2108 typically allow a user to interact with or control output elements that appear on the monitor or graphical user interface 2102 via a command such as a click of a button or the like.

The output device(s) 2106 include devices and mechanisms for outputting information from the data processing system 2120. These may include the monitor or graphical user interface 2102, speakers, printers, infrared LEDs, and so on as well understood in the art.

The communication network interface 2112 provides an interface to communication networks (e.g., communication network 2116) and devices external to the data processing system 2120. The communication network interface 2112 may serve as an interface for receiving data from and transmitting data to other systems. Embodiments of the communication network interface 2112 may include an Ethernet interface, a modem (telephone, satellite, cable, ISDN), (asynchronous) digital subscriber line (DSL), Fire-Wire, USB, a wireless communication interface such as Bluetooth or Wi-Fi, a near field communication wireless interface, a cellular interface, and the like.

The communication network interface 2112 may be coupled to the communication network 2116 via an antenna, a cable, or the like. In some embodiments, the communication network interface 2112 may be physically integrated on a circuit board of the data processing system 2120, or in some cases may be implemented in software or firmware, such as "soft modems", or the like.

The computing device 2100 may include logic that enables communications over a network using protocols such as HTTP, TCP/IP, RTP/RTSP, IPX, UDP and the like.

The volatile memory 2110 and the nonvolatile memory 2114 are examples of tangible media configured to store computer readable data and instructions to implement various embodiments of the processes described herein for generating foveated displays. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 2110 and the nonvolatile memory 2114 may be configured to store the basic programming and data constructs that provide the functionality of the disclosed processes and other embodiments thereof that fall within the scope of the present invention.

Logic 2122 that implements embodiments of the techniques disclosed herein may be stored in the volatile memory 2110 and/or the nonvolatile memory 2114. Said logic 2122 may be read from the volatile memory 2110 and/or nonvolatile memory 2114 and executed by the processor(s) 2104. The volatile memory 2110 and the nonvolatile memory 2114 may also provide a repository for storing data used by the logic 2122. For example the logic 2122 may be utilized to execute the foveated display method 1200 and/or the gaze tracking and utilization method 1300 depicted in FIG. 12 and FIG. 13, respectively.

The volatile memory 2110 and the nonvolatile memory 2114 may include a number of memories including a main random access memory (RAM) for storage of instructions and data during program execution and a read only memory (ROM) in which read-only non-transitory instructions are stored. The volatile memory 2110 and the nonvolatile memory 2114 may include a file storage subsystem providing persistent (non-volatile) storage for program and data files. The volatile memory 2110 and the nonvolatile memory 2114 may include removable storage systems, such as removable flash memory.

The bus subsystem 2118 provides a mechanism for enabling the various components and subsystems of data processing system 2120 communicate with each other as intended. Although the communication network interface 2112 is depicted schematically as a single bus, some embodiments of the bus subsystem 2118 may utilize multiple distinct busses.

It will be readily apparent to one of ordinary skill in the art that the computing device 2100 may be a device such as a smartphone, a desktop computer, a laptop computer, a rack-mounted computer system, a computer server, or a tablet computer device. As commonly known in the art, the computing device 2100 may be implemented as a collection of multiple networked computing devices. Further, the computing device 2100 will typically include operating system logic (not illustrated) the types and nature of which are well known in the art.

Terms used herein should be accorded their ordinary meaning in the relevant arts, or the meaning indicated by their use in context, but if an express definition is provided, that meaning controls.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C. § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

"Logic" herein refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

What is claimed is:

1. An augmented reality display system comprising:
   an inset display;
   a half mirror;
   a concave half mirror;
   a waveguide comprising the half mirror and the concave half mirror, the waveguide converting an inset image generated by the inset display into a foveal inset; and
   the inset display configured to respond to a control signal to set the foveal inset to a portion of a field-of-view of a user of the augmented reality display system.

2. The augmented reality display system of claim 1, further comprising:
   a holographic optical element; and
   a moveable stage coupled to the holographic optical element;
   whereby the holographic optical element may be translated in at least one spatial dimension with the moveable stage.

3. The augmented reality display system of claim 1, further comprising:
   a projector to generate a peripheral display.

4. The augmented reality display system of claim 3, the inset display emitting light to the foveal inset at a higher resolution than a resolution of light emitted by the projector for the peripheral display.

5. The augmented reality display system of claim 3, arranged such that the projector directs a peripheral image toward a prism, the prism refracts the peripheral image to a holographic optical element.

6. The augmented reality display system of claim 3, arranged such that the concave half mirror directs the foveal inset through a holographic optical element.

7. The augmented reality display system of claim 1, the inset display configured to respond to a pupil tracker control signal to set a position of the foveal inset on the field-of-view.

8. The augmented reality display system of claim 1, arranged such that the inset image is emitted toward the half mirror, the half mirror redirects the inset image toward the concave half mirror, and the concave half mirror directs the inset image through the half mirror and a holographic optical element to a pupil position of a user of the augmented reality display system.

9. The augmented reality display system of claim 1, the waveguide forming a reflective magnifier lens for the inset image.

10. An augmented reality display system comprising:
    a first beam path for a foveal inset image projected through a holographic optical element, the first beam path forming a reflective magnifier lens;
    a second beam path for a peripheral display image on the holographic optical element;
    pupil position tracking logic;
    the pupil position tracking logic generating control signals to set a position of the foveal inset on the holographic optical element, to determine the peripheral display image, and to control a moveable stage coupled to the holographic optical element; and
    the foveal inset image generated by an inset display, wherein varifocal operation with focal cues to infinity is achieved by moving the inset display.

11. The augmented reality display system of claim 10, the reflective magnifier lens comprising:
    a half mirror and a concave half mirror, wherein both sides of the concave half mirror are index-matched.

12. The augmented reality display system of claim 1, wherein the inset display is a 720p display or a 1080p display and the peripheral display image is generated by a laser projector of a lower resolution than the inset display.

13. The augmented reality display system of claim 12, arranged such that image rays originating from the laser projector reflect off the holographic optical element and converge to the pupil position.

14. The augmented reality display system of claim 10, the holographic optical element operable as a hybrid reflective and transparent image combiner.

15. The augmented reality display system of claim 10, further comprising an infrared light-emitting diode device.

16. The augmented reality display system of claim 15, arranged such that emitted infrared light from the infrared light-emitting diode device is reflected off a cornea of a user toward a half mirror that acts as a beam splitter.

17. The augmented reality display system of claim 16, the pupil position tracking logic utilizing the infrared light reflected off the cornea to determine the pupil position.

18. The augmented reality display system of claim 10, configured to generate the foveal inset image at a higher resolution than the peripheral display image.

* * * * *